(12) United States Patent
Lamb et al.

(10) Patent No.: US 12,210,958 B2
(45) Date of Patent: Jan. 28, 2025

(54) COMPRESSION OF SPARSE DEEP CONVOLUTIONAL NETWORK WEIGHTS

(71) Applicant: QUALCOMM Incorporated, San Diego, CA (US)

(72) Inventors: Aaron Lamb, San Diego, CA (US); Rexford Hill, San Diego, CA (US); Amin Ansari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 722 days.

(21) Appl. No.: 16/137,491

(22) Filed: Sep. 20, 2018

(65) Prior Publication Data

US 2019/0087713 A1 Mar. 21, 2019

Related U.S. Application Data

(60) Provisional application No. 62/561,640, filed on Sep. 21, 2017.

(51) Int. Cl.
*G06N 3/063* (2023.01)
*G06F 7/544* (2006.01)
(Continued)

(52) U.S. Cl.
CPC ............ *G06N 3/063* (2013.01); *G06F 7/5443* (2013.01); *G06N 3/045* (2023.01); *G06N 3/084* (2013.01); *G06N 3/044* (2023.01); *G06N 3/047* (2023.01)

(58) Field of Classification Search
CPC ...... G06N 3/0454; G06N 3/063; G06N 3/084; G06N 3/0445; G06N 3/0472; G06F 7/5443
See application file for complete search history.

(56) References Cited

U.S. PATENT DOCUMENTS 9,390,115 B2    7/2016    Liu et al.
9,692,450 B2    6/2017    Khalil et al.
(Continued)

FOREIGN PATENT DOCUMENTS

CN    106529670    3/2017
WO    2016118257    7/2016

OTHER PUBLICATIONS

A. Parashar et al., "SCNN: An Accelerator for Compressed-sparse Convolutional Neural Networks." In Proceedings of ISCA '17, Toronto, ON, Canada, Jun. 24-28, 2017, 14 pages. (Year: 2017).*

(Continued)

*Primary Examiner* — Abdullah Al Kawsar
*Assistant Examiner* — Asher H. Jablon
(74) *Attorney, Agent, or Firm* — ArentFox Schiff LLP

(57) ABSTRACT

The present disclosure describes methods, computer-readable media, and apparatuses for operating neural networks. For example, a first apparatus may receive a set of sparse weight vectors. The first apparatus may compress the set of sparse weight vectors to produce a compressed set of sparse weight vectors. The first apparatus may operate a neural network based on the compressed set of sparse weight vectors. In another example, a second apparatus may receive a set of sparse weight vectors. The second apparatus may perform a sparse computation based on the set of sparse weight vectors, and the performance of the sparse computation may produce one or more partial sums. The second apparatus may operate a neural network based at least in part on the one or more partial sums.

13 Claims, 17 Drawing Sheets

(51) Int. Cl.
*G06N 3/045* (2023.01)
*G06N 3/084* (2023.01)
*G06N 3/044* (2023.01)
*G06N 3/047* (2023.01)

(56) References Cited

U.S. PATENT DOCUMENTS

| | | | |
|---|---|---|---|
| 9,727,824 | B2 | 8/2017 | Rose et al. |
| 10,223,635 | B2 | 3/2019 | Annapureddy et al. |
| 10,614,798 | B2 * | 4/2020 | Seo ................. G10L 15/285 |
| 10,810,484 | B2 * | 10/2020 | Xie ................. G06N 3/0445 |
| 2006/0107263 | A1 * | 5/2006 | Benhase ............ G06F 9/485 |
| | | | 718/100 |
| 2009/0033977 | A1 * | 2/2009 | Morales ........... G06F 3/1285 |
| | | | 358/1.15 |
| 2012/0076401 | A1 | 3/2012 | Sanchez et al. |
| 2014/0089480 | A1 * | 3/2014 | Zhu ................. G06Q 10/06 |
| | | | 709/223 |
| 2016/0140084 | A1 | 5/2016 | Daga et al. |
| 2016/0322042 | A1 | 11/2016 | Vlietinck et al. |
| 2016/0328645 | A1 | 11/2016 | Lin et al. |
| 2017/0132496 | A1 | 5/2017 | Shoaib et al. |
| 2018/0285737 | A1 * | 10/2018 | Chen ................. G06N 3/063 |

OTHER PUBLICATIONS

Gremse et al. "Gpu-accelerated sparse matrix-matrix multiplication by iterative row merging." SIAM Journal of Scientific Computing, vol. 37, No. 1, pp. C54-C71, 2015 (Year: 2015).*

Han, Song, et al. "EIE: efficient inference engine on compressed deep neural network." Computer Architecture (ISCA), Jun. 2016 ACM/IEEE 43rd Annual International Symposium on. IEEE, pp. 243-254. (Year: 2016).*

Han S., et al., "ESE: Efficient Speech Recognition Engine with Sparse LSTM on FPGA," Proceedings of the 2017 ACM/SIGDA International Symposium on Field-Programmable Gate Arrays, Feb. 22, 2017, pp. 75-84 (see IDS Mar. 15, 2019, NPL doc. 2) (Year: 2017).*

Albericio et al., "Cnvlutin: Ineffectual-Neuron-Free Deep Neural Network Computing," SIGARCH Comput. Archit. News 44, 3 (Jun. 2016), 1-13. (Year: 2016).*

Fowers J., et al., "A High Memory Bandwidth FDGA Accelerator for Sparse Matrix-vector Multiplication," IEEE 22nd Annual International Symposium on Field-programmable Custom Computing Machines, May 2014, pp. 36-43, XP055538945, DOI: 10.1109/FCCM.2014.23 ISBN: 978-1-4799-5110-9.

Han S., et al., "ESE: Efficient Speech Recognition Engine with Sparse LSTM on FPGA," Proceedings of the 2017 ACM/SIGDA International Symposium on Field-Programmable Gate Arrays, Feb. 22, 2017, pp. 75-84, XP055535859, New York, USA, DOI: 10.1145/3020078.3021745, ISBN: 978-1-4503-4354-1.

International Search Report and Written Opinion—PCT/US2018/052142—ISA/EPO—Jan. 21, 2019.

Han S., et al., "Deep Compression: Compressing Deep Neural Networks with Pruning, Trained Quantization and Huffman Coding", Published as a Conference Paper at ICLR, Feb. 15, 2016, 14 Pages.

* cited by examiner

FIG. 3A  FIG. 3B  FIG. 3C

Respective activations

820 

802
receive a set of sparse weight vectors, each sparse weight vector comprising at least one zero weight element and at least one non-zero weight element 822
receive a set of non-sparse weight vectors 824
generate the set of sparse weight vectors by applying a function to adjust at least one non-zero element of at least one non-sparse weight vector of the set of non-sparse weight vectors to zero

806
operate the neural network based on the compressed set of sparse weight vectors 862
receive a set of input vectors 864
selectively apply a first input vector of the set of input vectors to at least one compressed sparse weight vector of the compressed set of sparse weight vectors to compute a respective partial sum corresponding to each compressed sparse weight vector of the compressed set of sparse weight vectors 866
accumulate the respective partial sum for each compressed sparse weight vector of the compressed set of sparse weight vectors 868
operate the neural network based at least in part on the accumulated respective partial sums

806
operate the neural network based on the compressed set of sparse weight vectors 882
refrain from uncompressing the compressed set of sparse weight vectors

920

906 perform a sparse computation based on the set of sparse weight vectors by refraining from performing one or more computations using the at least one zero weight element of the set of sparse weight vectors, the sparse computation producing one or more partial sums

922 control selection of inputs of the input vector that correspond to the at least one non-zero weight element of the sparse weight vector

924 refrain from selecting inputs of the first input vector that correspond to the at least one zero weight element of the sparse weight vector

*FIG. 9B*

COMPRESSION OF SPARSE DEEP CONVOLUTIONAL NETWORK WEIGHTS

CROSS-REFERENCE TO RELATED APPLICATION(S)

This application claims the priority of U.S. Provisional Application No. 62/561,640, entitled "COMPRESSION OF SPARSE DEEP CONVOLUTIONAL NETWORK WEIGHTS" and filed on Sep. 21, 2017, which is expressly incorporated by reference herein in its entirety.

BACKGROUND

Field

Certain aspects of the present disclosure generally relate to neural networks and, more particularly, to improving systems and methods of compression of sparse neural network weights.

Background

An artificial neural network, which may include an interconnected group of artificial neurons (e.g., neuron models), is a computational device or represents a method to be performed by a computational device.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes an input to a third layer of neurons, and so on. Deep neural networks (DNNs) may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Neural networks are increasingly used in a variety of applications. However, some neural networks may incur computational and power consumption overhead, for example, in devices having limitations on computational and/or power resources. A neural network to be implemented on a device having limited available computational and/or power resources may exceed thresholds of those limited available resources. For example, mobile devices, wearable devices, and/or Internet of Things (IoT) devices may include computational (e.g., on-chip) and/or power (e.g., battery) resources that may be exceeded by some neural networks. Accordingly, an approach to optimizing neural networks for implementation on various devices having limited computational and/or power resources may be needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

As described herein, a neural network may consume resources of a device on which the neural network is implemented. As neural networks increase in complexity and capability, neural networks may begin to exceed the available resources of some devices. That is, some neural networks may consume an amount of data, processor capacity, and/or power that may typically exceed on-chip and/or power supply resources of some devices. Examples of such devices may include mobile devices, wearable devices, servers, Internet of Things (IoT) devices, devices implementing computer vision and/or detection, devices implementing objection recognition, virtual reality devices, augmented reality devices, automotive devices, sound devices, or essentially any other device in which power, performance, and/or memory bandwidth may be factors. In such devices having some limited computational (e.g., on-chip) and/or power (e.g., battery) resources, the present disclosure may provide aspects of controlling a neural network to operate within device limitations.

A weight matrix may include a plurality of weights that are input to artificial neurons or nodes in order to influence the output (e.g., activation) of those nodes. A row of a weight matrix may be a weight vector, which may include weights for a layer of the neural network. In some aspects, one or more weights may be eliminated (e.g., replaced with a zero) in order to reduce overhead (e.g., processing power) without appreciably degrading the accuracy of the neural network. For example, weights of a layer of an exemplary DCN may be thirty to seventy percent "sparse"—e.g., such that thirty to seventy percent of the weights of a weight vector for the exemplary layer are replaced with zeros.

To address issues commensurate with the consumption of computational (e.g., system bandwidth, processor capability, etc.) and/or power (e.g., battery, power supply, etc.) resources by neural networks, aspects of the present disclosure may describe such neural networks as implementing sparse weight vectors that may be compressed. However, a neural network that implements one or more a compressed set of sparse weight vectors may be operated without decompressing the compressed set of sparse weight vectors, e.g., before activation of one or more neurons at one or more layers of the neural network. The present disclosure may describe various methods, computer-readable medias, and/or or apparatuses for operating a neural network with a compressed set of sparse weight vectors.

In an aspect of the disclosure, a first method, a first computer-readable medium, and a first apparatus for operating a neural network are provided. For example, the first apparatus for operating a neural network may be configured to receive a set of sparse weight vectors, and at least a first sparse weight vector of the set of sparse weight vectors includes at least one zero weight element and at least one non-zero weight element. The apparatus may be configured to compress the set of sparse weight vectors to produce a compressed set of sparse weight vectors by removing one or more of the at least one zero weight element of at least the first sparse weight vector of the set of sparse weight vectors and combining at least the first sparse weight vector with at least a second sparse weight vector of the set of sparse weight vectors. The apparatus may be configured to operate the neural network based on the compressed set of sparse weight vectors.

In an aspect of the disclosure, a second method, a second computer-readable medium, and a second apparatus for operating a neural network are provided. For example, the second apparatus for operating a neural network may be configured to receive a set of sparse weight vectors, and each sparse weight vector may include at least one zero weight element and at least one non-zero weight element. The apparatus may be configured to perform a sparse computation based on the set of sparse weight vectors by refraining from performing one or more computations using the at least one zero weight element of the each sparse weight vector of the set of sparse weight vectors, and the performance of the sparse computation produces one or more partial sums. The apparatus may be configured to operate the neural network based at least in part on the one or more partial sums.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 3A-D are diagrams illustrating neural networks, in accordance with aspects of the present disclosure.

FIGS. 8A-E are flow charts illustrating methods of operating a neural network, in accordance with certain aspects of the present disclosure.

FIGS. 9A-B are flow charts illustrating methods of operating a neural network, in accordance with certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Figure 1:
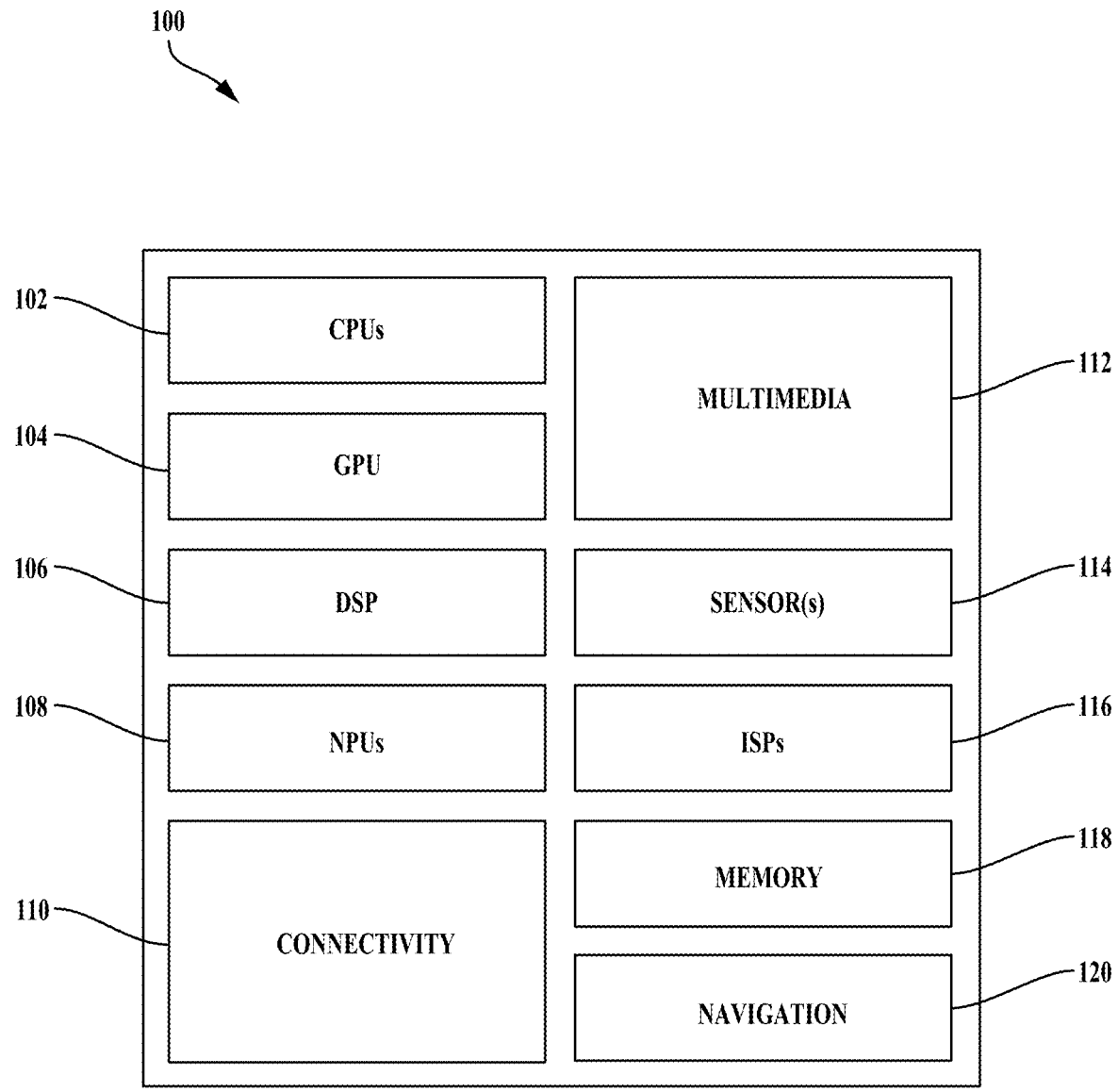
FIG. 1 illustrates an example implementation of designing a neural network using a system-on-a-chip (SOC), including a general-purpose processor, in accordance with certain aspects of the present disclosure.

FIG. 1 illustrates an example implementation of the aforementioned motion modeling system using a system-on-a-chip (SOC) 100, which may include a general-purpose processor (CPU) or multi-core general-purpose processors (CPUs) 102 in accordance with certain aspects of the present disclosure. Each of the illustrated components of the SOC 100 may be communicatively coupled with one or more of the other components, e.g., via a bus or other interconnect.

Variables (e.g., neural signals and synaptic weights), system parameters associated with a computational device (e.g., neural network with weights), delays, frequency bin information, and task information may be stored in a memory block associated with one or more Neural Processing Units (NPUs) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a connectivity block 110, which may include fourth generation long term evolution (4G LTE) connectivity, fifth generation (5G) new radio (NR) connectivity, unlicensed Wi-Fi connectivity, USB connectivity, Bluetooth connectivity, and the like, and a multimedia processor 112 that may, for example, process audio and/or visual output. In one implementation, the NPU is implemented in the CPU, DSP, and/or GPU. The SOC 100 may also include a sensor(s) processor 114, image signal processors (ISPs) 116, and/or navigation component 120, which may include a global positioning system.

The SOC 100 may be based on an instruction set, such as an advanced reduced instruction set computing (RISC) (ARM) instruction set. According to a first aspect of the present disclosure, instructions for operating a neural network may be stored in memory 118, and may be loaded into and executed by the processor 102. The instructions loaded into the processor 102 may cause the SOC 100 to receive a set of sparse weight vectors, wherein at least a first sparse weight vector of the set of sparse weight vectors includes at least one zero weight element and at least one non-zero weight element. The instructions loaded into the processor 102 may cause the SOC 100 to compress the set of sparse weight vectors to produce a compressed set of sparse weight vectors by removing one or more of the at least one zero weight element of the at least the first sparse weight vector of the set of sparse weight vectors and combining at least the first sparse weight vector with at least a second sparse weight vector of the set of sparse weight vectors. The instructions loaded into the processor 102 may cause the SOC 100 to operate the neural network based on the compressed set of sparse weight vectors.

According to a second aspect of the present disclosure, the instructions loaded into the processor 102 may cause the SOC 100 to receive a set of sparse weight vectors, and each sparse weight vector may include at least one zero weight element and at least one non-zero weight element. The instructions loaded into the processor 102 may cause the SOC 100 to perform a sparse computation based on the set of sparse weight vectors by refraining from performing one or more computations using the at least one zero weight element of the each sparse weight vector of the set of sparse weight vectors, and the performance of the sparse computation produces one or more partial sums. The instructions loaded into the processor 102 may cause the SOC 100 to operate the neural network based at least in part on the one or more partial sums.

Figure 2:
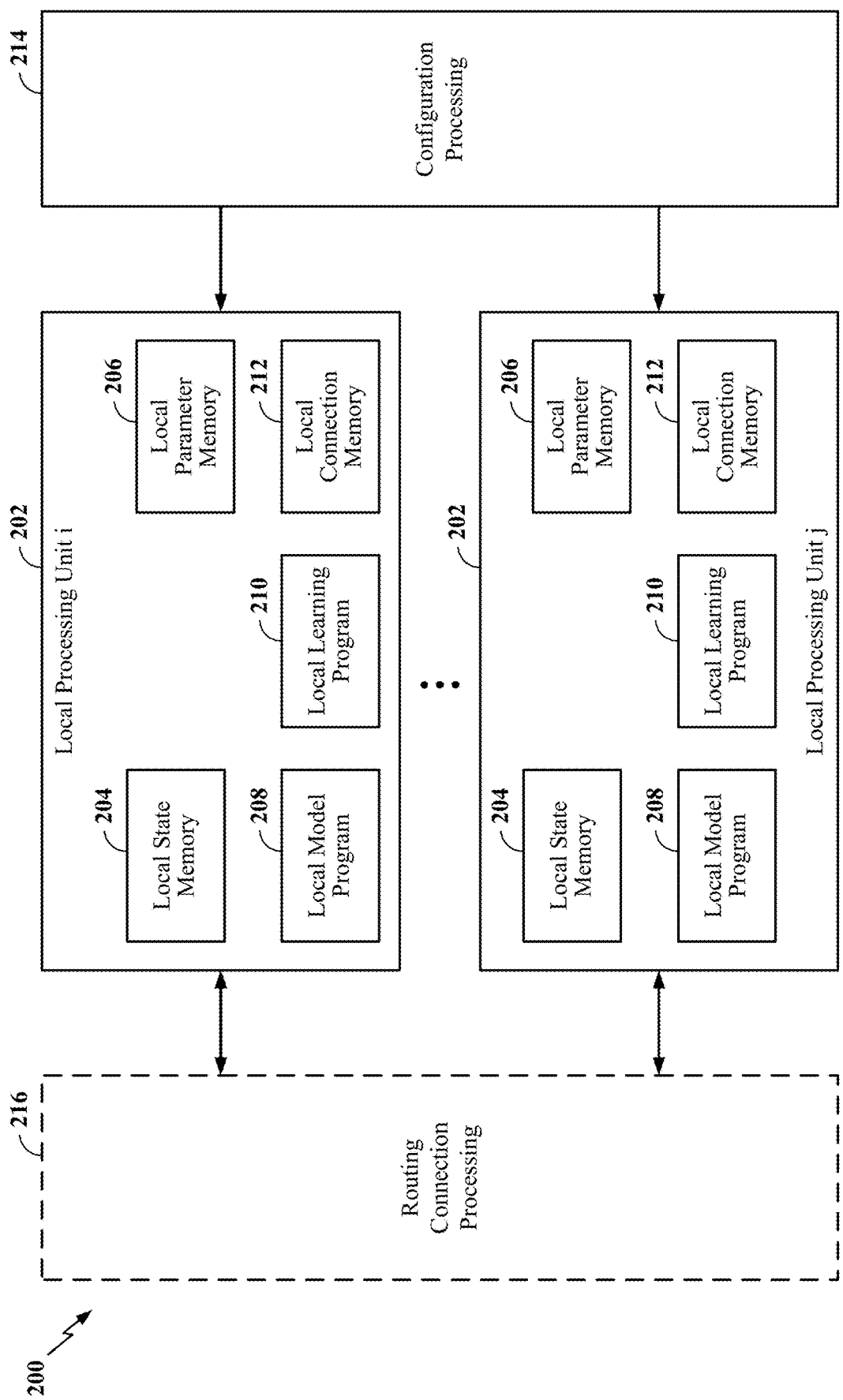
FIG. 2 illustrates an example implementation of a system, in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may include a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Referring to FIGS. 3A-3D, the connections between layers of a neural network may be fully connected 302 or locally connected 304. In a fully connected network 302 of FIG. 3A, a neuron in a first layer may communicate its output to every neuron in a second layer, so that each neuron in the second layer will receive input from every neuron in the first layer. Alternatively, in a locally connected network 304 of FIG. 3B, a neuron in a first layer may be connected to a limited number of neurons in the second layer. A convolutional network 306 of FIG. 3C may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Figure 3D:
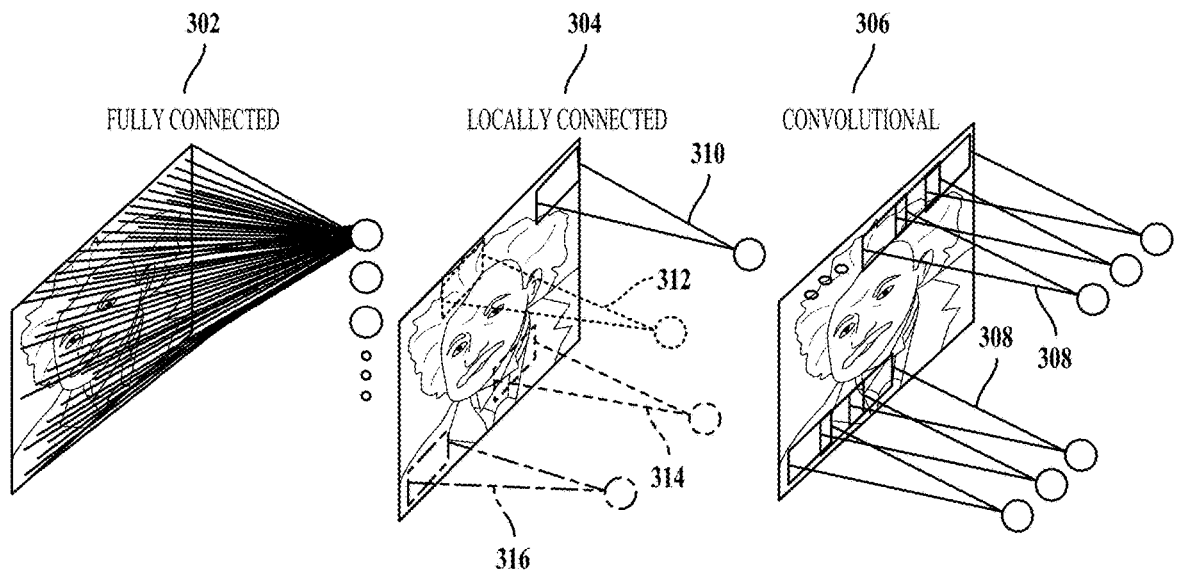
Figure 3D:
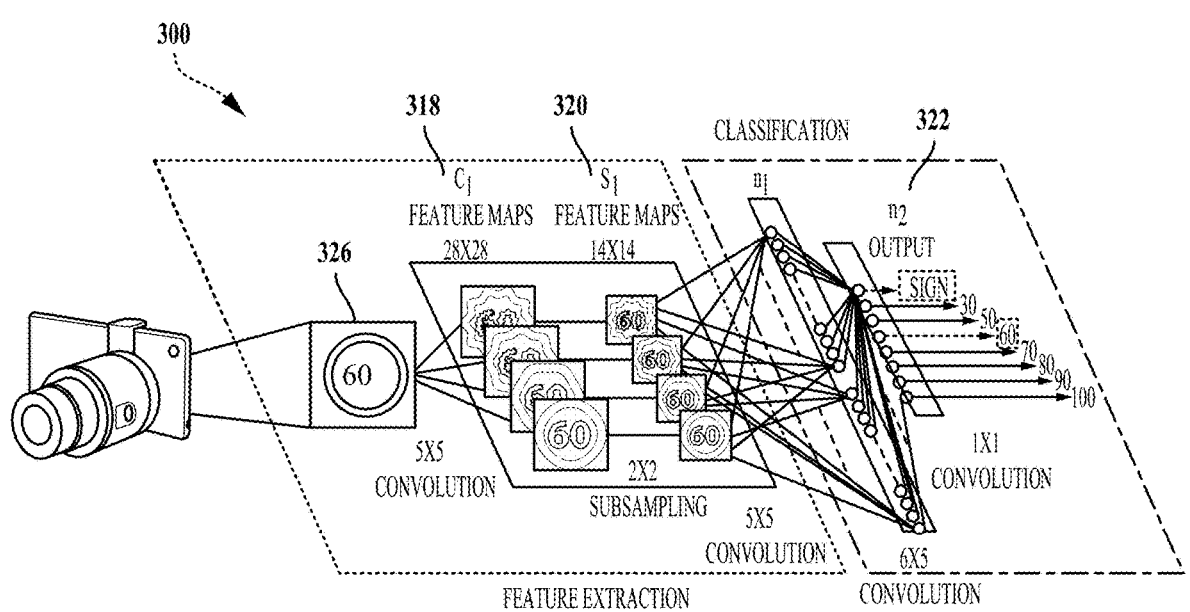

Locally connected neural networks may be well suited to problems in which the spatial location of inputs is meaningful. Referring to FIG. 3D, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like. For example, an image may be filtered by one or more convolutional kernels of a suitable dimension for the image (e.g., 5×5), which may result in one or more feature maps. Feature maps may be subsampled with a commensurate kernel size (e.g., 2×2) in order to determine values for the one or more feature maps. Another iteration may be performed in which the subsampled images are filtered with convolutional kernels (e.g., 5×5), and then again subsampled for local invariance and dimensionality reduction.

A deep convolutional network (DCN) may be a network of convolutional network(s), configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that includes recurrent or feedback connections.

A DCN may be trained with supervised learning. During training, a DCN may be presented with an image, such as a cropped image of a speed limit sign 326, and a "forward pass" may then be computed to produce an output 322. The output 322 may be a vector of values corresponding to features such as "sign" and "60." The network designer may want the DCN to output a high score for some of the neurons in the output feature vector (e.g., a score may be a value indicating the certainty with which a feature map is classified, with higher scores corresponding to higher certainty and lower scores corresponding to lower certainty). For example the one scores corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models that may include multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels.

In the context of a convolutional neural network (CNN), channels may provide an input to each layer of the CNN. For example, three channels may be color channels for identifying red, green, and blue, and a fourth channel may be an informational channel in order to identify spatial information about an image (e.g., a distance between pixels), pixel size, intensity, or temperature. Each layer of a CNN may include multiple input channels. Filters may be applied the channels of a layer, e.g., in order to filter the input channel. Accordingly, an output channel of a layer may be based on the filter applied to the input channel. In one aspect, the results of filtering an input channel (e.g., through a plurality of filters) may be added together to obtain the corresponding output channel.

The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks (DNNs) are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3E:
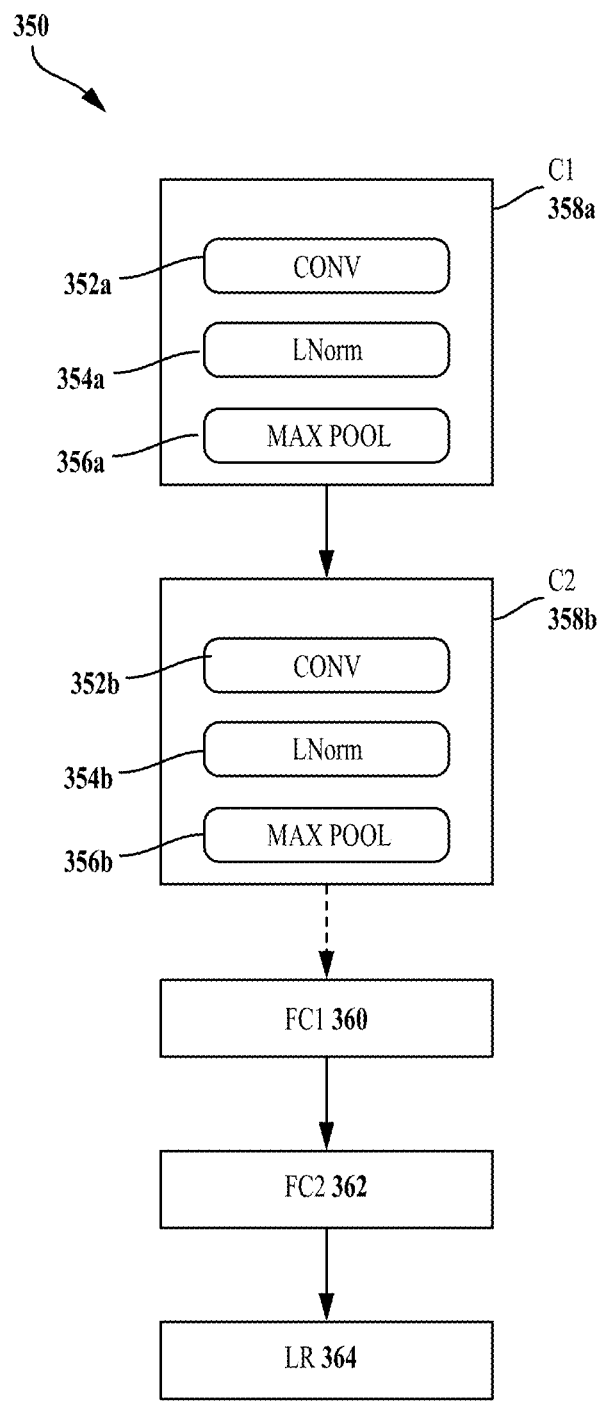
FIG. 3E is a block diagram illustrating a neural network, in accordance with aspects of the present disclosure.

FIG. 3E is a block diagram illustrating an exemplary deep convolutional network 350. The deep convolutional network 350 may include multiple different types of layers based on connectivity and weight sharing. As shown in FIG. 3E, the exemplary deep convolutional network 350 includes multiple convolution blocks (e.g., C1 358a and C2 358b). Each of the convolution blocks may be configured with a respective one of the convolutional layers 352a-b, a respective one of the normalization layers (LNorm) 354a-b, and a respective one of the pooling layers 356a-b. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. Each of the normalization layers 354a-b may be used to normalize the output of the convolution filters from a respective one of the convolutional layers 352a-b. For example, each of the normalization layers 354a-b may provide whitening or lateral inhibition. Each of the pooling layers 356a-b may provide down sampling aggregation over space for local invariance and dimensionality reduction.

The parallel filter banks, for example, of a deep convolutional network may be loaded on a CPU 102 or GPU 104 of an SOC 100, to achieve high performance and low power consumption. In alternative embodiments, the parallel filter banks may be loaded on the DSP 106 or an ISP 116 of an SOC 100. In addition, the DCN may access other processing blocks that may be present on the SOC 100, such as processing blocks 114 and 120, dedicated, respectively, to sensors and navigation.

The deep convolutional network 350 may also include one or more fully connected layers (e.g., FC1 360 and FC2 362). The deep convolutional network 350 may further include a logistic regression (LR) layer 364. Between each layer of the deep convolutional network 350 are weights that are to be updated. The output of each layer may serve as an input of a succeeding layer in the deep convolutional network 350 to learn hierarchical feature representations from input data (e.g., images, audio, video, sensor data and/or other input data) supplied at the first convolution block C1 358a.

A neural network may include a plurality of layers, and each layer may include a set of nodes (also known as "units" or "artificial neurons"). Each node may receive inputs. A first input may be provided as input to the neural network (e.g., at an input layer of node(s)) or as an output of a node from another layer (e.g., at hidden layer(s) of node(s)). A first input may be associated with a weight element (or "weight"), which may introduce a bias associated with the first input (e.g., based on relative importance of the first input). Some nodes may receive a weight (e.g., a "bias") that is associated with the node, e.g., in order to affect output or activation of the node. Each node may apply an activation function (e.g., a sigmoid function, a rectified linear unit (ReLU) function, etc.) to the inputs in order to generate an output or activation. The output or activation may be provided at an output layer of the neural network or may be provided as an input to another node. Accordingly, the weights may be stored in memory, such as in a set of weight vectors.

Figure 4A:
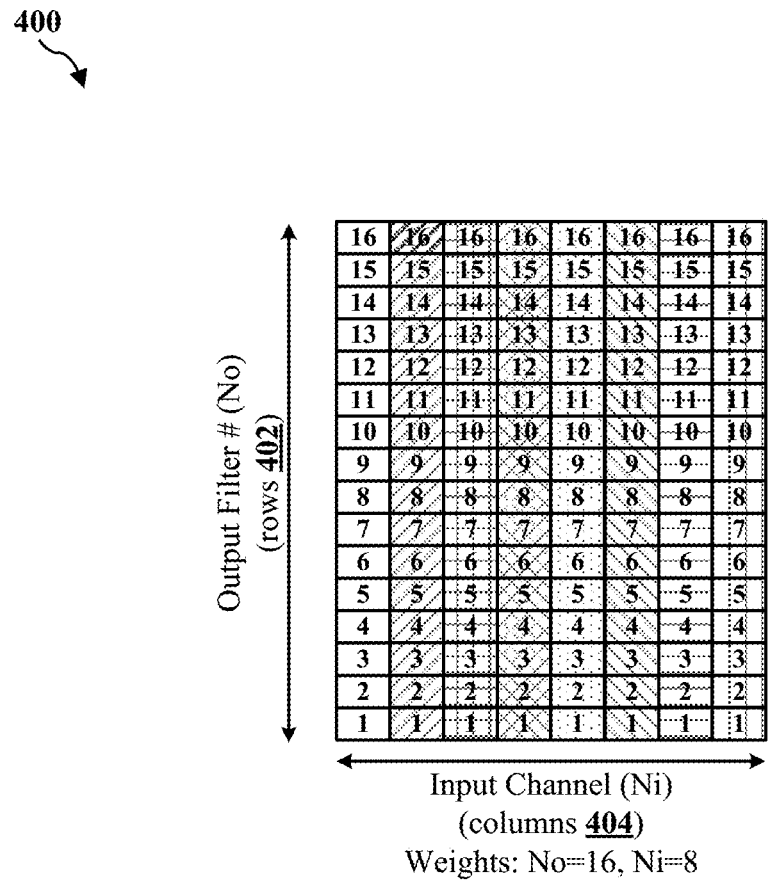
FIGS. 4A-E are diagrams illustrating weight elements associated with a neural network, in accordance with aspects of the present disclosure.
Figure 4A:
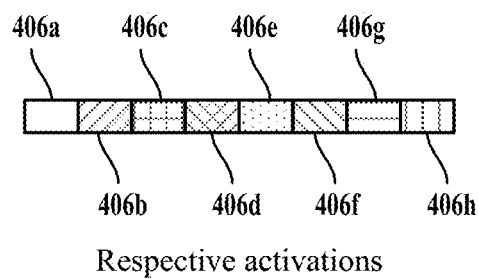

FIGS. 4A-E are diagrams illustrating weights to be implemented by a neural network. FIG. 4A illustrates a set of weight vectors 400, including sixteen weight vectors for eight activations 406a-h. Each of the rows 402 of the set of weight vectors 400 may correspond to a different weight vector (e.g., sixteen eight-element weight vectors). For example, in the context of a CNN, a weight vector may be an output filter, which may be convolved with an input (e.g., an eight-channel input for the eight activations 406a-h). Each of the columns 404 of the set of weight vectors 400 may correspond to each of the set of activations 406a-h that may be needed to perform a set of calculations, e.g., for a channel i. An activation may be a value that is output from a node of one layer (e.g., a prior layer) that serves as input for a node of another layer (e.g., a next layer) of the neural network. Each of the numerical values in each of the set of weight vectors 400 may correspond to a different weight (e.g., at least one weight 1 for one filter and a first activation 406a, at least one weight 2 for a second filter and a first activation 406a, . . . , at least one weight 16 for a sixteenth filter and a first activation 406a, etc.) (n.b., a value of each at least one weight may not be the illustrated numerical value).

Illustratively, the set of weight vectors 400 may include sixteen weight vectors, each of which may be used for each of the input channels corresponding to each of the activations 406a-h. For each weight of each weight vector corresponding to an input channel, a MAC operation may be performed (e.g., eight MAC operations for each weight corresponding to each of the eight activations 406a-h). One partial sum may be accumulated over MAC operations in each individual row of the rows 402, for a total of sixteen partial sums from 128 calculations (sixteen times eight).

According to various aspects, one or more MAC operations may consume a clock cycle of a system architecture (e.g., clock cycles of the SOC 100). For example, a system architecture may support eight MAC operations per clock cycle. Therefore, 128 calculations (e.g., sixteen weight vectors, each having eight elements, multiplied with an eight-channel input) may be performed in sixteen clock cycles (e.g., 128 calculations divided by eight MAC operations per clock cycle).

As neural networks increase in complexity, the number, size, and/or length of weight vectors and/or input channels may commensurately increase. This increase may consume a number of clock cycles that is unsatisfactory and/or unsuitable for some system architectures. Therefore, one or more weights may be eliminated, such as by removing a weight from a weight vector of the set of weight vectors. The elimination/removal of a weight from a weight vector may be accomplished by setting the weight to zero. For example, one or more weights may be eliminated through pruning, fine-tuning, retraining, and/or another approach in order to identify one or more weights that may be eliminated without unsatisfactorily degrading accuracy of an output layer of the neural network.

By eliminating one or more weights, a set of "sparse" weight vectors may be obtained or generated. A set of sparse weight vectors may maintain those weights that are determined to be useful for a satisfactorily accurate result to be obtained from an output layer of a neural network. For example, one or more layers of a CNN (e.g., a DCN) may be approximately thirty to seventy percent sparse, with the remaining approximately seventy to thirty percent of weights being populated with weights considered to be useful for obtaining an accurate result from the CNN.

Figure 4B:
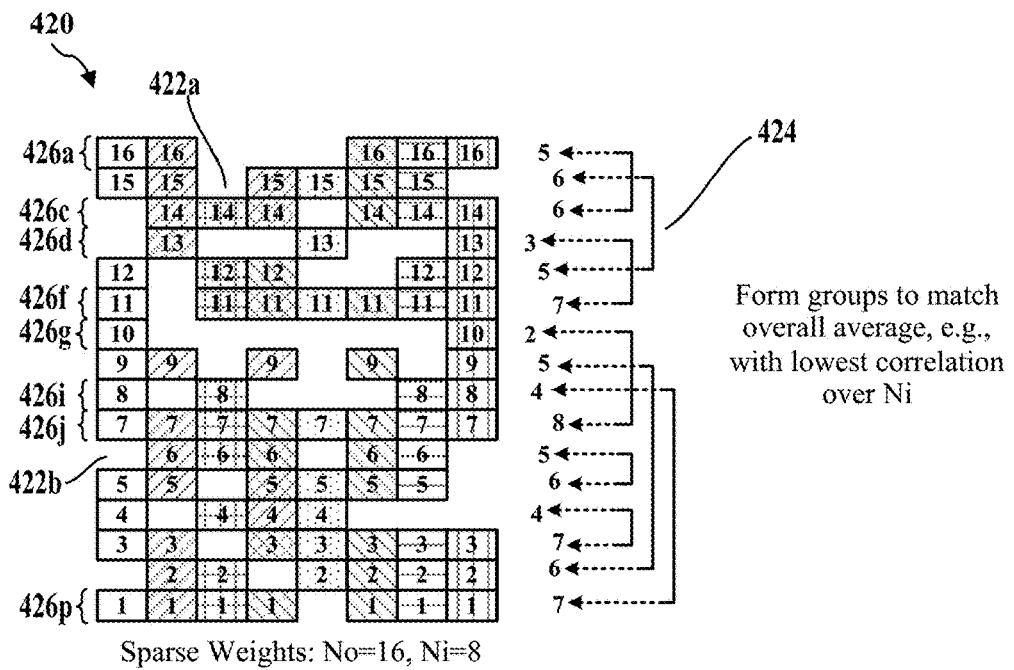

FIG. 4B illustrates a first set of sparse weight vectors 420. For example, one or more weights of each output filter (e.g., an output filter corresponding to one of the rows 402) of the set of weight vectors 400 may be eliminated in order to generate the set of sparse weight vectors 420. To generate the set of sparse weight vectors 420, one or more weights of the set of weight vectors 400 may be adjusted from a non-zero value to a zero value, which may eliminate those exemplary elements 422a-b. For example, a neural network implementing the set of weight vectors 400 may be pruned, fine-tuned, and/or retrained in order to eliminate one or more weights, which then may be zero-weight elements 422a-b. In one aspect, the generation of the set of sparse weight vectors 420 may include rounding a respective value of a respective weight in order to eliminate the respective weight (e.g., a respective value rounded to zero may allow the respective weight to be eliminated), applying a respective bias term to a respective value of a respective weight in order to eliminate the respective weight (e.g., biasing a respective value to zero may eliminate the respective weight), or another approach to identifying and eliminating one or more weights of the set of weight vectors 400 to generate the set of sparse weight vectors 420.

As shown in FIG. 4B, a set of sparse weight vectors 420 is illustrated. In an aspect, a plurality of weights may be eliminated or removed, so that one or more of the set of sparse weight vectors 420 includes zero-weight elements 422a-b (e.g., the zero-weight elements 422a-b may be values set to zero). With the zero-weight elements 422a-b, the set of sparse weight vectors 420 may include eighty-six weights (e.g., thirty-three percent sparsity with sixty-seven percent occupancy), and each sparse weight vector 426 of the set of sparse weight vectors 420 may include an average of 5.4 weights. FIG. 4B is illustrative, and other approaches to creating or generating sparse weight vectors may be practiced without departing from the scope of the present disclosure.

In introducing the zero-weight elements 422a-b, the number of MAC operations may be correspondingly reduced (e.g., because no MAC operations need to be performed for zero-weight elements 422a-b). For example, one weight vector 426a of the set of sparse weight vectors 420 may include five non-zero weights (e.g., for activations 406a-b, 406f-h) and, therefore, five MAC operations may be performed (instead of eight MAC operations for a respective one of the row 402 of the set of weight vectors 400). Therefore, instead of consuming sixteen clock cycles for 128 calculations (e.g., for eight MAC operations per clock cycle), MAC operations for the set of sparse weight vectors 420 may be completed in eleven clock cycles (e.g., eighty-six weights of the set of sparse weight vectors 420 divided by eight MAC operations per clock cycle equals 10.75, adding one "dummy" operation to consume the eleven total clock cycles).

According to the exemplary aspect, the number of sparse weight vectors 426 of the set of sparse weight vectors 420 is sixteen. However, each of the sparse weight vectors of the set of sparse weight vectors 420 includes zero-weight elements 422a-b, thereby reducing the number of MAC operations (and correspondingly clock cycles) to be performed for each sparse weight vector of the set of sparse weight vectors 420. Therefore, at least two sparse weight vectors 426 of the set of sparse weight vectors 420 may be mapped for a respective MAC operation for each clock cycle (e.g., of eight potential MAC operations per clock cycle), e.g., in order to perform the MAC operations within the eleven clock cycles.

In various aspects, one or more respective sparse weight vectors of the set of sparse weight vectors 420 may be combined, e.g., to be mapped for a respective MAC operation for a clock cycle. That is, each of the sparse weight vectors 426 of the set of sparse weight vectors 420 may be paired or combined in a larger grouping with at least one other sparse weight vector 426 of the set of sparse weight vectors 420, resulting in combinations 424 of sparse weight vectors. For example, the first sparse weight vector 426a may be combined with the third sparse weight vector 426c. Similarly, the ninth sparse weight vector 426i may be combined with the sixteenth sparse weight vector 426p.

In order to determine combinations 424, a respective time to perform a respective set of MAC operations for each sparse weight vector of the set of sparse weight vectors 420 may be determined. For example, the number of clock cycles to be consumed for MAC operations for each sparse weight vector of the set of sparse weight vectors 420 may be determined. A respective one of the combinations 424 may be determined based on the time to perform MAC operations for each of the sparse weight vectors of each of the combinations 424. A respective combined time to perform MAC operations for each of the combinations 424 may be compared to a first threshold, which may be a target number of clock cycles based on the weights in the set of sparse weight vectors 420 (e.g., the first threshold may be the target of eleven clock cycles for the eighty-six remaining weights of the set of sparse weight vectors 420). If a respective combined time satisfies the first threshold (e.g., is less than eleven clock cycles), then those sparse weight vectors may be combined.

In one aspect, a combination 424 of sparse weight vectors may include identifying a weight vector of the set of sparse weight vectors 420 having a highest number of MAC operations to be performed and identifying a weight vector of the set of sparse weight vectors 420 having a lowest number of MAC operations to be performed. For example, combining two sparse weight vectors may be based on the zero-weight elements 422a-b included in each of the two sparse weight vectors, e.g., so that two weight vectors respectively having a highest number of zero-weight elements 422a-b and a lowest number of zero-weight elements 422a-b may be combined. For example, the tenth weight vector 426j may include eight MAC operations (e.g., the highest number of MAC operations) and the seventh weight vector 426g may include two MAC operations (e.g., the lowest number of MAC operations). In other words, the combined time to perform MAC operations for the seventh weight vector 426g combined with the tenth weight vector 426j may be ten clock cycles, which may satisfy the first threshold of eleven clock cycles. Accordingly, the seventh weight vector 426g may be combined with the tenth weight vector 426j.

Similarly, a sparse weight vector of the set of sparse weight vectors 420 having a second highest number of MAC operations may be identified.

Correspondingly, a sparse weight vector of the set of sparse weight vectors 420 having a second lowest number of MAC operations may be identified. These identified weight vectors may be combined if the combined number of MAC operations satisfies the first threshold. For example, the combination of the fourth sparse weight vector 426d with the sixth sparse weight vector 426f may be mapped for MAC operations within the eleven total clock cycles (e.g., three MAC operations for the four weights of the fourth sparse weight vector 426d with the activations 406b, 406e, 406h and seven MAC operations for the seven weights of the sixth sparse weight vector 426f with the activations 406a, 406c-h).

In one aspect, a combined time for MAC operations of a combination of the combinations 424 may not satisfy the first threshold (e.g., the combined time may meet or exceed eleven clock cycles). For example, the first weight vector 426a may include five weights and, therefore, five MAC operations may be performed. Similarly, the third weight vector 426c may include six weights and, therefore, six MAC operations may be performed. Accordingly, the combination 424 of the first weight vector 426a and the third weight vector 426c may be mapped for MAC operations to eleven total clock cycles, which may not satisfy the first threshold (e.g., less than eleven clock cycles). Thus, one or more combinations 424 may be split across two clock cycles within activations 406a-h, which may satisfy a second threshold that may be determined (e.g., twelve clock cycles).

Figure 4C:
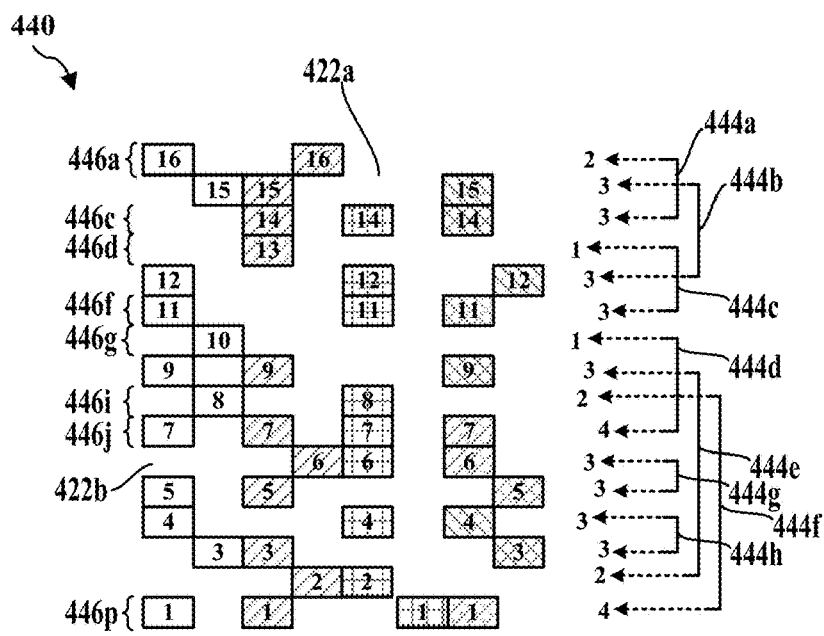

As illustrated in FIG. 4C, a second grouping of sparse weight vectors may be formed for a second set of sparse weight vectors 440. By way of example, the second set of sparse weight vectors 440 may include the MAC operations for each weight of the second set of sparse weight vectors 440 corresponding to a subset of the activations 406a-h, such as a subset of four activations 406a-d of the eight activations 406a-h. The MAC operations for each of the weight vectors and a corresponding one of the subset of four activations 406a-d may be split across two clock cycles. In a similar example, MAC operations for sparse weight vectors 446 corresponding to another subset of four activations 406e-h may be split across two clock cycles.

Splitting MAC operations across two clock cycles for the weight vectors and the corresponding subset of four activations 406a-h may include assigning a first set of MAC operations to one clock cycle, and assigning a second set of MAC operations (e.g., the remaining MAC operations not completed in the first clock cycle) to a second clock cycle.

For example, the MAC operations for the sparse weight vectors 446 corresponding to the first activation 406a may be split over two clock cycles. Similarly, the MAC operations for the sparse weight vectors 446 corresponding to the second activation 406b may be split over two clock cycles. When MAC operations are split over two clock cycles, the first sparse weight vector 446a and the third sparse weight vector 446c may form a first combination 444a. Similarly, the fourth activation 406d may be split over two clock cycles, and the fourth sparse weight vector 446c and the sixth weight vector 426f form a third combination 444c. In some aspects, each of the MAC operations performed for the subset of four activations 406a-d may be split over two clock cycles, and the sparse weight vectors 446 may form a respective one of the combinations 444a-h. The MAC operations for each of the other subset of activations 406e-h may be similarly split over two clock cycles, and two or more sparse weight vectors 446 corresponding to the other subset of four activations 406e-h may be combined. Therefore, MAC operations for one or more of the activations 406a-h may be spread over two clock cycles.

The grouping illustrated in FIG. 4C is intended to be illustrative. Thus, different groupings may be formed in order to satisfy the second threshold and/or approach the theoretical minimum number of clock cycles. For example, several iterations of splitting one or more combinations 424 across two clock cycles within activations 406a-h may be attempted in order to identify a grouping that satisfies the second threshold and/or approaches the theoretical minimum number of clock cycles.

Figure 4D:
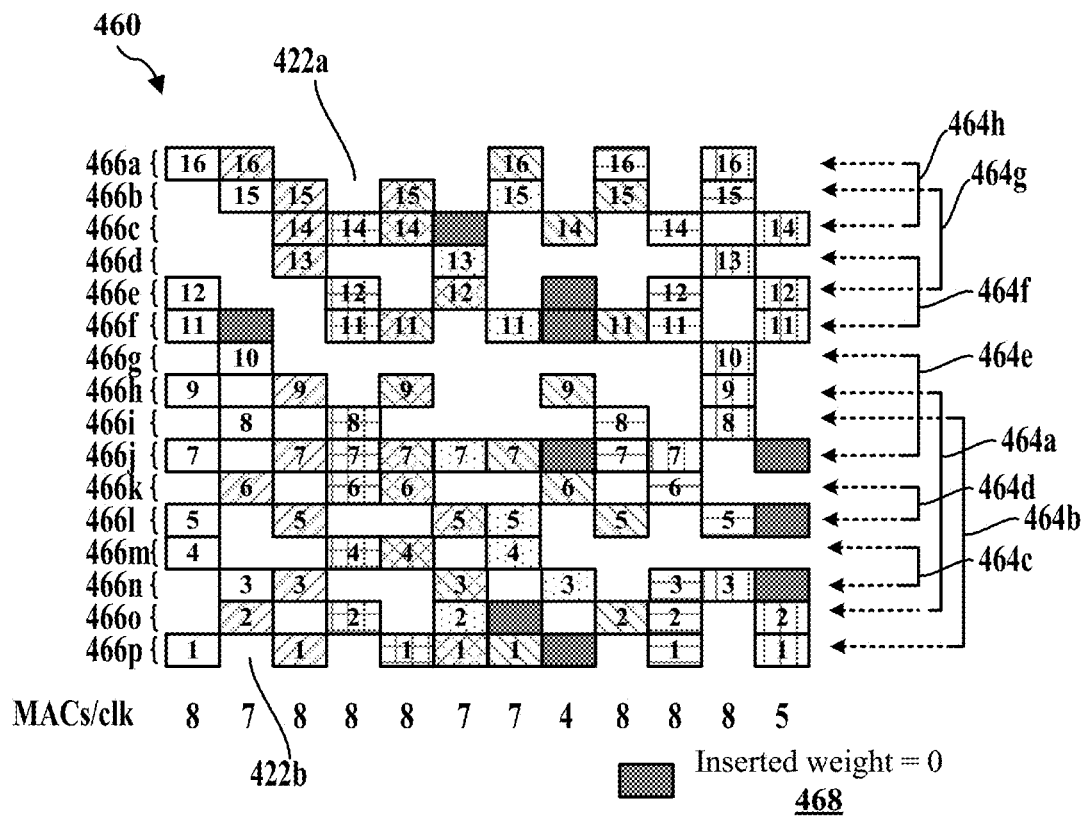

FIG. 4D illustrates a first aspect of a set of sparse weight vectors 460. Weights of the set of sparse weight vectors 460 may be mapped to a plurality of MAC elements, which may perform the MAC operations for each of the weights of the set of sparse weight vectors 460. For example, MAC elements may be hardware, software, and/or firmware elements, e.g., implemented on the SOC 100 of FIG. 1. In the illustrated example, eight MAC elements are included, although a different number of MAC elements may be present in different aspects. One or more inserted weights 468 may be inserted to provide values for the corresponding MAC operations where there is too much local sparsity— e.g., an inserted weight 468 may be a value of zero that does not affect computational accuracy.

Figure 7:
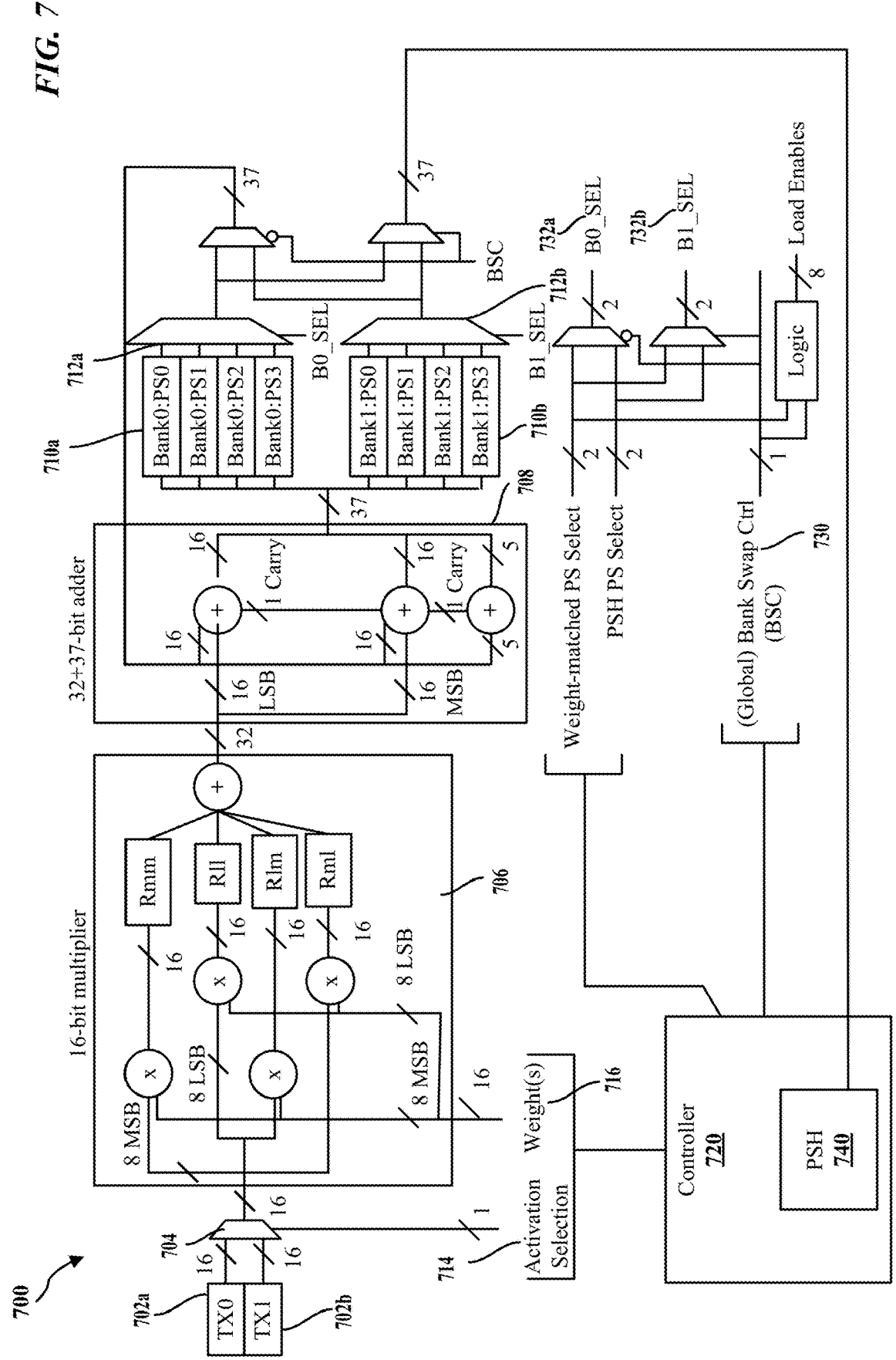
FIG. 7 is a block diagram illustrating an exemplary hardware architecture for operating a neural network based on weight elements, in accordance with aspects of the present disclosure.

In an aspect, eight MAC operations may be performed for each clock cycle. Each of the MAC elements 464a-h may be provided two of the activations 406a-h upon which to perform a MAC operation. Each of the MAC operations may select one of the two activations 406a-h, for example, based on an activation selection (e.g., by an activation selection value 714 as shown in FIG. 7, infra, the activation value of a prior node, such as the set of inputs 702a-b). Accordingly, each of the MAC elements 464a-h may perform a MAC operation for a weight of a sparse weight vector 466 and a corresponding one of the activations in each clock cycle. For example, during one clock cycle one MAC element 464h may perform a MAC operation for a weight of a sparse weight vector 466a and the corresponding activation 406a (e.g., no MAC operation may be performed for the third sparse weight vector 446c and the first activation 406a).

In one aspect, MAC operations for the first sparse weight vector 466*a* (corresponding to the activations 406*a-b*, 406*f-h*) and the third sparse weight vector 466*c* (corresponding to the activations 406*b-d*, 406*f-h*) may be mapped to an eighth MAC element 464*h* (e.g., one of eight MAC hardware components); the second sparse weight vector 466*b* (corresponding to the activations 406*a-b*, 406*d-g*) and the fifth sparse weight vector 466*e* (corresponding to the activations 406*a*, 406*c-d*, 406*g-h*) may be mapped to a seventh MAC element 464*g* (e.g., another of eight MAC hardware components); the fourth sparse weight vector 466*d* (corresponding to the activations 406*b*, 406*e*, 406*g*) and the sixth sparse weight vector 466*f* (corresponding to the activations 406*a*, 406*c-h*) may be mapped to a sixth MAC element 464*f*; the seventh sparse weight vector 466*g* (corresponding to the activations 406*a*, 406*g*) and the tenth sparse weight vector 466*j* (corresponding to the activations 406*a-h*) may be mapped to a fifth MAC element 464*e*; the eleventh sparse weight vector 466*k* (corresponding to the activations 406*b-d*, 406*f-g*) and the twelfth sparse weight vector 466*l* (corresponding to the activations 406*a-b*, 406*d-g*) may be mapped to a fourth MAC element 464*d*; the thirteenth sparse weight vector 466*m* (corresponding to the activations 406*a*, 406*c-e*) and the fourteenth sparse weight vector 466*n* (corresponding to the activations 406*a-b*, 406*d-e*, 406*g-h*) may be mapped to a third MAC element 464*c*; the eighth sparse weight vector 466*h* (corresponding to the activations 406*a-b*, 406*d*, 406*f-g*) and the fifteenth sparse weight vector 466*o* (corresponding to the activations 406*b-c*, 406*e*, 406*f-h*) may be mapped to a second MAC element 464*b*; and the ninth sparse weight vector 466*i* (corresponding to the activations 406*a*, 406*c*, 406*g-h*) and sixteenth sparse weight vector 466*p* (corresponding to the activations 406*a-d*, 406*f-h*) may be mapped to a first MAC element 464*a*. In some aspects, the aforementioned mapping may be fixed and/or may be generated a priori (e.g., not generated at run time).

Figure 4E:
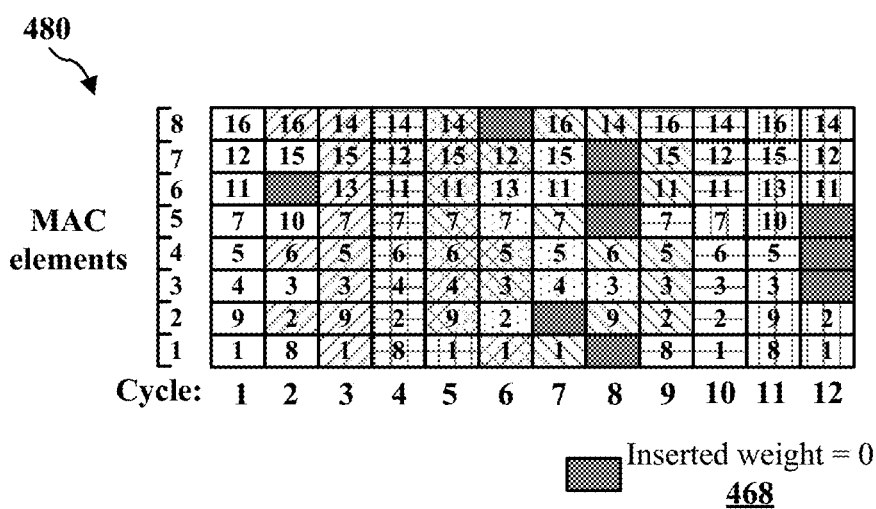

FIG. 4E illustrates an aspect of a compressed set of sparse weight vectors 480. For the compressed set of sparse weight vectors 480, the zero-weight elements 422*a-b* may be removed (e.g., the compressed set of sparse weight vectors 460 may be vertically compressed to allow for compact multiplication by eight MAC elements over twelve clock cycles). Accordingly, instead of 128 MAC operations for the set of weight vectors 400, fewer MAC operations may be performed for the compressed set of sparse weight vectors 480 (e.g., eighty-six MAC operations for non-zero weight elements and ninety-six MAC operations including zero-weight elements). In one example, 96 MAC operations may be performed by eight MAC elements over twelve clock cycles, including MAC operations for zero-weight elements. One or more inserted weights 468 may be inserted to provide values for the corresponding MAC operations where there is too much local sparsity—e.g., an inserted weight 468 may be a value of zero that does not affect computational accuracy.

In a first clock cycle, eight MAC operations for a portion of the first activation 406*a* may be performed. In a second clock cycle, seven MAC operations for the remaining portion of the first activation 406*a* and a portion of the second activation 406*b* may be performed. In some aspects, an inserted weight 468 equal to zero may be inserted, e.g., because only up to two activations are available per clock cycle. In a third clock cycle, eight MAC operations may be performed for the remaining portion of the second activation 406*b*. Accordingly, MAC operations for each of the activations 406*a-h* may be performed, e.g., over twelve clock cycles. Therefore, the number of clock cycles may be reduced from sixteen to twelve with an aspect of a compressed set of sparse weight vectors 480.

With the aspect of the compressed set of sparse weight vectors 480, twelve clock cycles may be consumed for the MAC operations for each of the activations 406*a-h*. Therefore, the number of clock cycles may be reduced from sixteen to twelve with this an aspect of a set of sparse weight vectors. However, FIG. 4E illustrates one aspect of mappings to MAC elements 464*a-h*, and other possible mappings may be possible in order to reduce the number of clock cycles and, potentially, reach the theoretical bound of eleven clock cycles.

In one example, an activation layer may include M activations (e.g., inputs), and NM-element weight vectors. Therefore, N×M MAC operations may be performed. One or more of the weight vectors of the M-element weight vectors may be sparse and, as described in the present disclosure, a set of sparse weight vectors may be compressed. Because a set of sparse weight vectors may be compressed (forming a compressed set of sparse weight vectors), fewer than N×M MAC operations may be performed, as one or more of the M elements of the compressed set of sparse weight vectors may be removed. A processor of a system (e.g., the CPU 102 of the SOC 100) may include L MAC elements, and therefore the activation layer may be processed in fewer than (N×M)/L clock cycles. In the illustrated example, L is equal to eight, M is equal to eight, and N is equal to sixteen.

Figure 5:
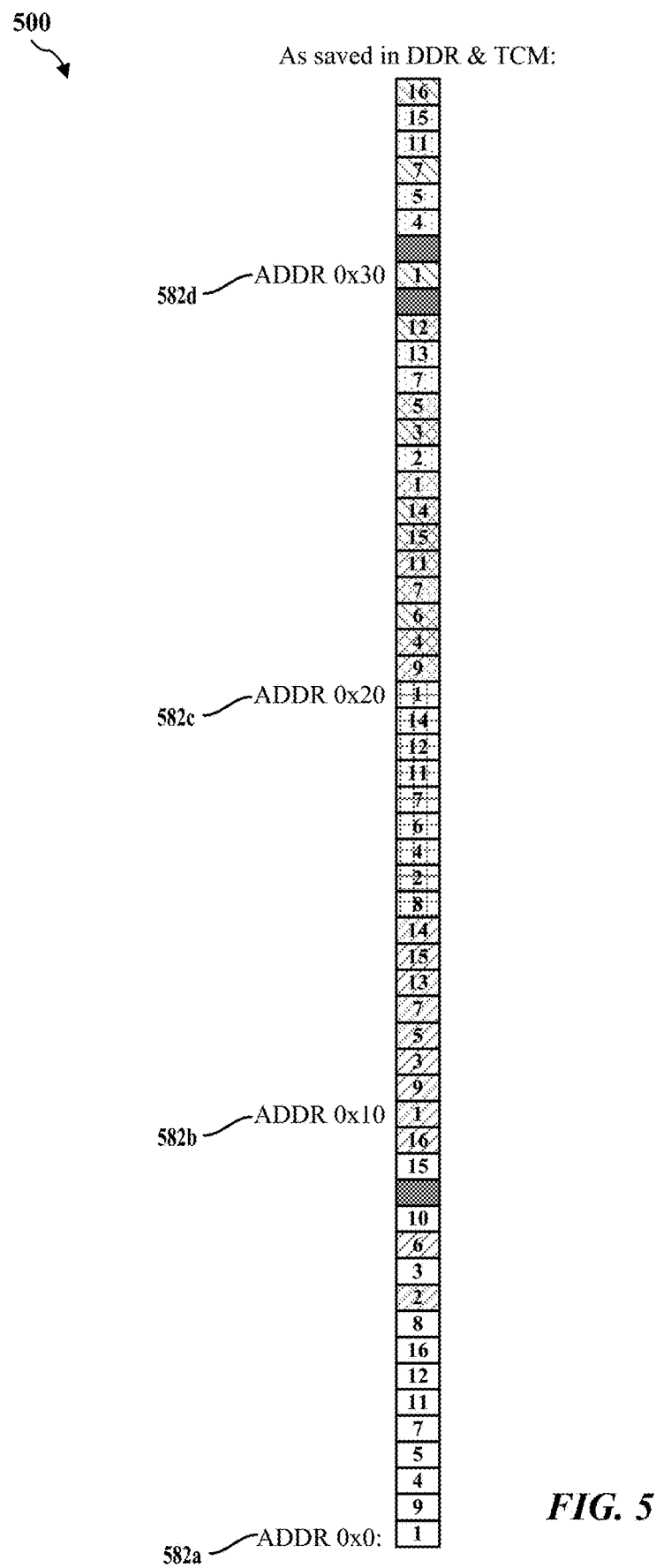
FIG. 5 is a block diagram illustrating weight elements in memory for operating a neural network, in accordance with aspects of the present disclosure.

Now with reference to FIG. 5, a memory 500 is illustrated, which may be a portion of memory 118 of FIG. 1. The memory 500 may be tightly-coupled memory (TCM) and/or double data rate (DDR) memory. The memory 500 may include a plurality of addresses, including addresses 582*a-d*. According to an example, a compressed set of sparse weight vectors (e.g., the compressed set of sparse weight vectors 480) may be linearly mapped into memory (e.g., memory 118). In this example, the memory 500 is illustrated as including a portion of the compressed set of sparse weight vectors 480.

As indicated with respect to FIG. 4E, one or more inserted weights 468 may be added, in addition to the weights of the compressed set of sparse weight vectors. For example, beginning at the first address 582*a*, a first weight of a first row and first column of the compressed set of sparse weight vectors may be mapped to the memory 500. Next, a second weight of a second row and the first column of the compressed set of sparse weight vectors may be mapped to memory 500, and so forth. After each weight of the first column is mapped to memory 500, a weight of the first row and second column may be mapped to memory 500. Accordingly, each weight of the compressed set of sparse weight vectors may be mapped to memory 500. The mapping of the weights to memory 500 may be performed at compile time when generating a static DDR image for the neural network.

While the mapping of weights to memory 500 may interleave weights associated with activations 406*a-h*, any address (e.g., one of the addresses 582*a-d*) may be either one of two possible activations 406*a-h*, as the result of the address modulo the number of MAC elements (e.g., eight MAC elements 464*a-h*). Accordingly, each MAC element may select one between two of the activations 406*a-h*, for example, based on an activation selection bit(s). In some aspects, mapping may reorder the series of weights according to an activation 406*a-h* (e.g., according to filter number), and further interleave two series corresponding to sequential activations 406*a-h*.

Figure 6:
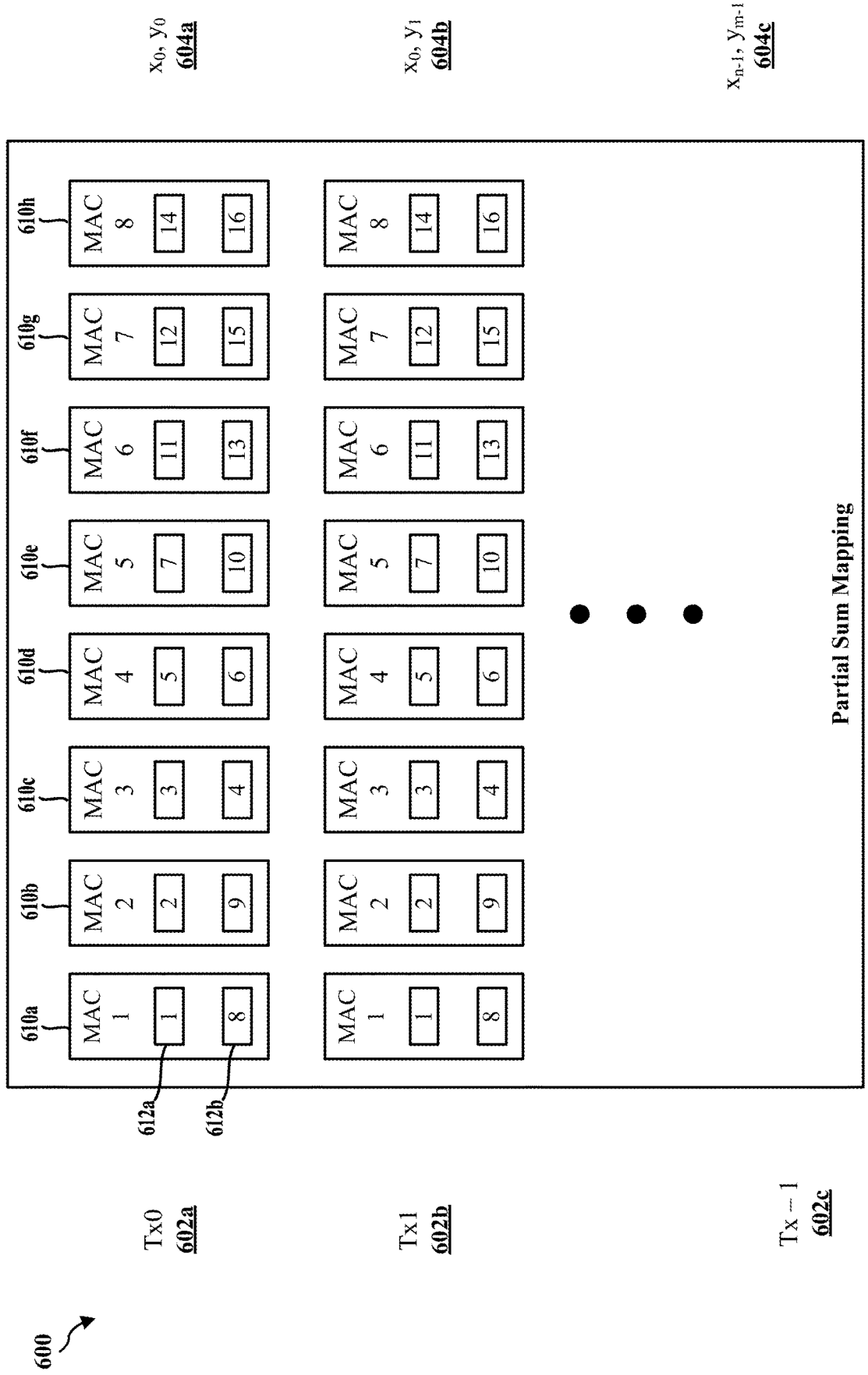
FIG. 6 is a block diagram illustrating an exemplary hardware mapping for operating a neural network based on weight elements, in accordance with aspects of the present disclosure.

FIG. 6 illustrates a mapping of a compressed set of sparse weight vectors (e.g., the compressed set of sparse weight vectors 480 of FIG. 4E) to a plurality of MAC elements 610a-h. Each of the MAC elements 610a-h may be implemented in hardware, software, and/or firmware. Each of the MAC elements 610a-h may be configured to compute a partial sum, for example, over an activation (Tx) (e.g., the activations 406a-h of FIGS. 4A-E). Each of the MAC elements 610a-h may include a first bank 612a and a second bank 612b. Each of the banks 612a-b of each of the MAC elements 610a-h may have a respective weight (e.g., one of weight 1 through weight 16) mapped thereto.

The activations 602a-c may be provided as input vectors representing a set of spatial points (e.g., each of the activations 602a-c may be a different (x, y) coordinate pair), and a spatial point may be based on the activation value of a prior node. Each of the activations 602a-c may be a respective activation sample to be provided to each of the first banks 612a and each of the second banks 612b of each of the MAC elements 610a-h. Accordingly, each of the activations 602a-c may be provided (e.g., broadcast) to each of the MAC elements 610a-h for each weight of a compressed set of sparse weight vectors. Each of the MAC elements 610a-h may be replicated for each pairing of one of the activations 602a-c with a weight.

For each of the activations 602a-c, the MAC elements 610a-h may compute a respective one of the outputs 604a-c, which may include partial sums that may be accumulated over the activations 602a-c. Each of the outputs 604a-c may correspond to a compressed set of sparse weight vectors (e.g., the compressed set of sparse weight vectors 480).

In one aspect, each element of the compressed set of sparse weight vectors corresponding to one of the activations 602a-c may be unique, and may be mapped to one of the banks 612a-b of each of the MAC elements 610a-h. For example, for a first activation 602a, a first weight 1 may be mapped to the first bank 612a of the first MAC element 610a, and an eighth weight 8 may be mapped to the second bank 612b of the first MAC element 610a. Similarly, for the first activation 602a, a second weight 2 may be mapped to the first bank 612a of the second MAC element 610b, and a ninth weight 9 may be mapped to the second bank 612b of the second MAC element 610b, and so forth.

For each of the activations 602a-c, the MAC elements 610a-h may compute a partial sum for a respective one of the outputs 604a-c. Each of the outputs 604a-c may be a vector (e.g., a vector may include sixteen values corresponding to the banks 612a-b of the MAC elements 610a-h). For example, the output 604c for the activation 602c may be a spatial point $(x_{n-1}, y_{m-1})$ representing a vector having a set of sixteen values for an n*m replication of the MAC elements 610a-h.

In one aspect, no more than two of the activations may be applied in a single clock cycle. Thus, the MAC elements 610a-h may compute samples corresponding to weights 1, 2, 3, 5, 7, 11, 12, and then 14 of the first bank 612a. Similarly, the MAC elements 610a-h may compute samples corresponding to weights 8, 9, 4, 6, 10, 13, 15, and then 16 of the second bank 612b. Then, an output 604a may be a spatial point (e.g., an (x, y) coordinate pair) representing a vector of sixteen values for the banks 612a-b of the MAC elements 610a-h. The outputs 604a-c may be provided to a next layer of the neural network as an input (e.g., the activations 602a-c for the next layer of the neural network may be based on the outputs 604a-c of the current layer of the neural network).

In an aspect, the outputs 604a-c may be unordered (e.g., due to weight compression). However, the outputs 604a-c may not be reordered when stored in memory (e.g., memory 118, memory 500). Instead, a compressed set of sparse weight vectors for a next layer of the neural network (e.g., a next iteration of partial sums through MAC elements 610a-h) may be reordered to match the order of the outputs 604a-c.

Reordering the set of weight vectors for the next layer of the neural network may be performed a priori. Accordingly, a set of sparse weight vectors may be compressed, and the neural network may apply the compressed set of sparse weight vectors without uncompressing and/or time-aligning the weights and activations (e.g., as each column of a set of weight vectors, such as the set of weight vectors 400, corresponds to a different activation or channel). That is, a neural network may refrain from uncompressing a compressed set of weight vectors during operation.

In addition, different approaches to compression may be implemented without departing from the present disclosure. For example, weight vectors compressed using different approaches may be reordered as described herein, and a neural network may apply the compressed set of sparse weight vectors without uncompressing and/or time-aligning the weights and activations even when different approaches to compression are practiced.

FIG. 7 illustrates an exemplary architecture 700 for operating a neural network based on a compressed set of sparse weight vectors. The illustrated architecture 700 may include a controller 720 and a partial sum handler (PSH) 740. Further, the architecture 700 may include an architecture of a MAC element, such as one of the MAC elements 610a-h of FIG. 6. The architecture 700 may be implemented in hardware (e.g., by the SOC 100 of FIG. 1), software, firmware, and/or a combination thereof. The illustrated architecture 700 may operate in a sixteen-bit mode; however, other modes are possible within the present disclosure (e.g., eight-bit mode, etc.). In an aspect, the architecture 700 may operate using any of a variety of numeric representations, including fixed-point, floating, signed, unsigned, and so forth.

The controller 720 may be configured to communicate with (e.g., control) a MAC element, which may include at least a multiplier 706, an adder 708, and one or more buffers 710a-b. In some aspects, the controller 720 may be configured to communicate with a plurality of MAC elements, each of which may include at least a multiplier and an adder. For example, the controller 720 may communicate with the MAC elements 610a-h of FIG. 6.

The architecture 700 may include a set of inputs (TX0, TX1) 702a-b, which may be configured to receive an input vector. In one aspect, an input vector may include a set of activations (e.g., corresponding to channels) (e.g., the activations 406a-h of FIGS. 4A-E). Through the set of inputs 702a-b, two activations of an input vector may be provided by a multiplexer (MUX) 704. In one aspect, the controller 720 may control the inputs 702a-b such that a first activation received at the first input 702a and a second activation received at the second input 702b may be applied in a clock cycle, and the controller 720 may refrain from applying any other activations during the same clock cycle.

The architecture 700 may obtain a compressed set of sparse weight vectors 716 (e.g., the compressed set of sparse weight vectors 480 of FIG. 4E). The architecture 700 may refrain from uncompressing the compressed set of sparse weight vectors 716. Rather, to align weights of the compressed set of sparse weight vectors 716, the architecture 700 may reorder the weights of the compressed set of sparse weight vectors 716 in order to align the weights with corresponding activations of an input vector. Referring to FIG. 4A, for example, the set of weight vectors 400 may illustrate correspondence between a respective weight and a respective activation.

The controller 720 may provide an activation selection value 714 to the MUX 704. The activation selection value 714 may indicate an activation (e.g., value) of another node, such as a node of a prior layer of the neural network. Based on the activation selection value 714, one activation of the two activations may be selected by the MUX 704. In so doing, the controller 720 may selectively apply a first input vector of the set of input vectors to at least one sparse weight vector of the compressed set of sparse weight vectors 716. For example, the controller 720 may align one weight of a compressed set of sparse weight vectors 716 with the one activation of the input vector that may be selected based on the activation selection value 714. In other words, the controller 720 may cause an activation to be aligned with the corresponding weight(s) of the compressed set of weight vectors 716 included in the compressed set of sparse weight vectors 716 without first uncompressing the compressed set of sparse weight vectors. Additionally, the controller 720 may be configured to perform sparse computations with the compressed set of weight vectors, for example, by refraining from performing computations (e.g., MAC operations) for zero-weight elements of the compressed set of sparse weight vectors corresponding to activations from the input vector. Accordingly, the architecture 700 may be configured to perform computations (e.g., multiplication and addition) with a compressed set of sparse weight vectors, and the compressed set of sparse weight vectors may remain compressed during operation of the neural network.

The activation selected by the MUX 704 may be applied to the corresponding weights of the compressed set of sparse weight vectors 716 in a multiplier 706. In one aspect, the multiplier 706 may be a sixteen-bit multiplier. In such an aspect, a sixteen-bit multiplication may be decomposed into four eight-bit multiplications, followed by additions of each sixteen-bit result. Thus, the eight most signification bits (MSB) of a weight and an activation may be multiplied, the eight MSB of the weight and the eight least significant bits (LSB) of the activation may be multiplied, the eight LSB of the weight and the eight MSB of the activation may be multiplied, the eight MSB of the weight and the eight LSB of the activation may be multiplied, and the corresponding additions may be performed with the aforementioned products. In some aspects, an exponent (e.g., power of two) may be included for each product in order to align the decimal points for further addition.

The result of the multiplier 706 may be a thirty-two-bit result. An adder 708 may accumulate a local sum with the thirty-two-bit result from the multiplier 706. The local sum may be a thirty-seven-bit sum (thirty-two bit result plus five bits for growth to avoid overflow) accumulated from previous iterations of other activations (e.g., channels). In one aspect, the adder 708 may decompose the thirty-two bit result and the thirty-seven-bit local sum into two cascaded sixteen-bit additions followed by a five-bit adder (or counter) based on the upper carry-out.

The architecture 700 may include two buffers 710a-b, in which partial sums from the adder 708 may be stored. For example, when the activation received at the first input 702a is selected based on the activation selection value 714, a first partial sum (P0) may be stored in the first buffer 710a. Because a MAC element may receive more than one corresponding weight for each activation, the architecture 700 may apply corresponding weights to the same activation over several iterations, and a local partial sum may be accumulated in the current buffer (e.g., buffer 710a) for each iteration. For example, the first buffer 710a may store four partial sums. The controller 720 may control the buffer in use of the buffers 710a-b with a bank swap control (BSC) value 730; that is, the controller 720 may coordinate buffer synchronization with the PSH 740 based on the BSC value 730.

The partial sums accumulated in one of the buffers 710a-b are then provided to the PSH 740. One of two local values 732a-b (B0_SEL or B1_SEL) may be used to select one of a set of partial sums of one of the buffers 710a-b to be supplied to the PSH 740, e.g., based on a weight-matched partial sum selection or a PSH partial sum selection selected by the BSC value 730. The controller 720 may control the one of the two local values 732a-b (e.g., using the weight-matched partial sum selection or the PSH partial sum selection) so that only one partial sum of the partial sums PS0, PS1, PS2, PS3 is provided to the PSH 740 when that partial sum is available (e.g., not being modified) and contains valid data. The each of the two local values 732a-b may be formed from a control TCM entry used for each weight of the compressed set of sparse weight vectors 716 in combination with the activation selection value 714.

The PSH 740 may receive the accumulated partial sums. The PSH 740 may combine the received accumulated partial sums with bias values and/or prior partial sums. In addition, the PSH 740 may handle saturation and rounding operations, perform predicated parametric ReLU (PReLU) multiplication, scaling, and so forth. The PSH 740 may provide output based on the accumulated partial sums (e.g., to output TCM), and the neural network may be operated based on the output of the PSH 740.

FIGS. 8A-E illustrate methods 800, 820, 840, 860, 880 for operating a neural network based on a compressed set of sparse weight vectors, in accordance with various aspects of the present disclosure. The methods 800, 820, 840, 860, 880 may be practiced in various components of the present disclosure, including the SOC 100 of FIG. 1, the MAC elements 610a-h of FIG. 6, and/or the architecture 700 of FIG. 7. In various aspects, one or more of the operations may be omitted, transposed, and/or contemporaneously performed. Some potential optional operations may be illustrated with dashed lines.

Figure 8A:
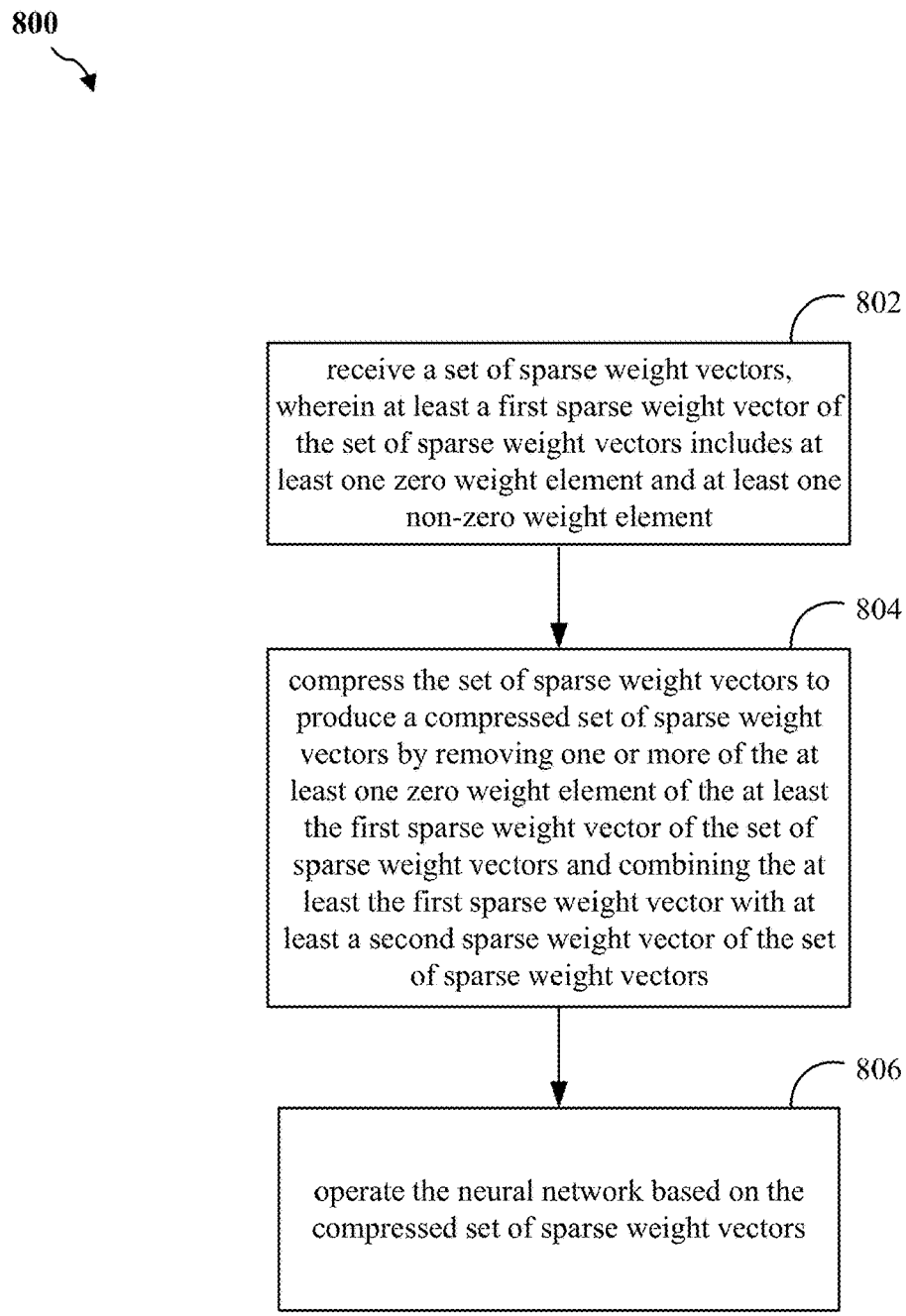

First with respect to FIG. 8A, at operation 802, a set of sparse weight vectors may be received. The set of sparse weight vectors may include at least one zero-weight element and at least one non-zero weight element. For example, a set of sparse weight vectors may be identified in memory, and the identified set of sparse weight vectors may be accessed from memory. FIG. 8B, infra, may describe an aspect of receiving a set of sparse weight vectors.

In the context of FIGS. 4A-E and 5-7, the controller 720 may receive a set of sparse weight vectors. For example, the controller 720 may receive the set of sparse weight vectors 420, and the set of sparse weight vectors may include weights that are non-zero weight elements and may also include one or more zero-weight elements 422a-b. In one aspect, the set of sparse weight vectors 420 may be based on a set of non-sparse weight vectors, such as the set of weight vectors 400.

Figure 8C:
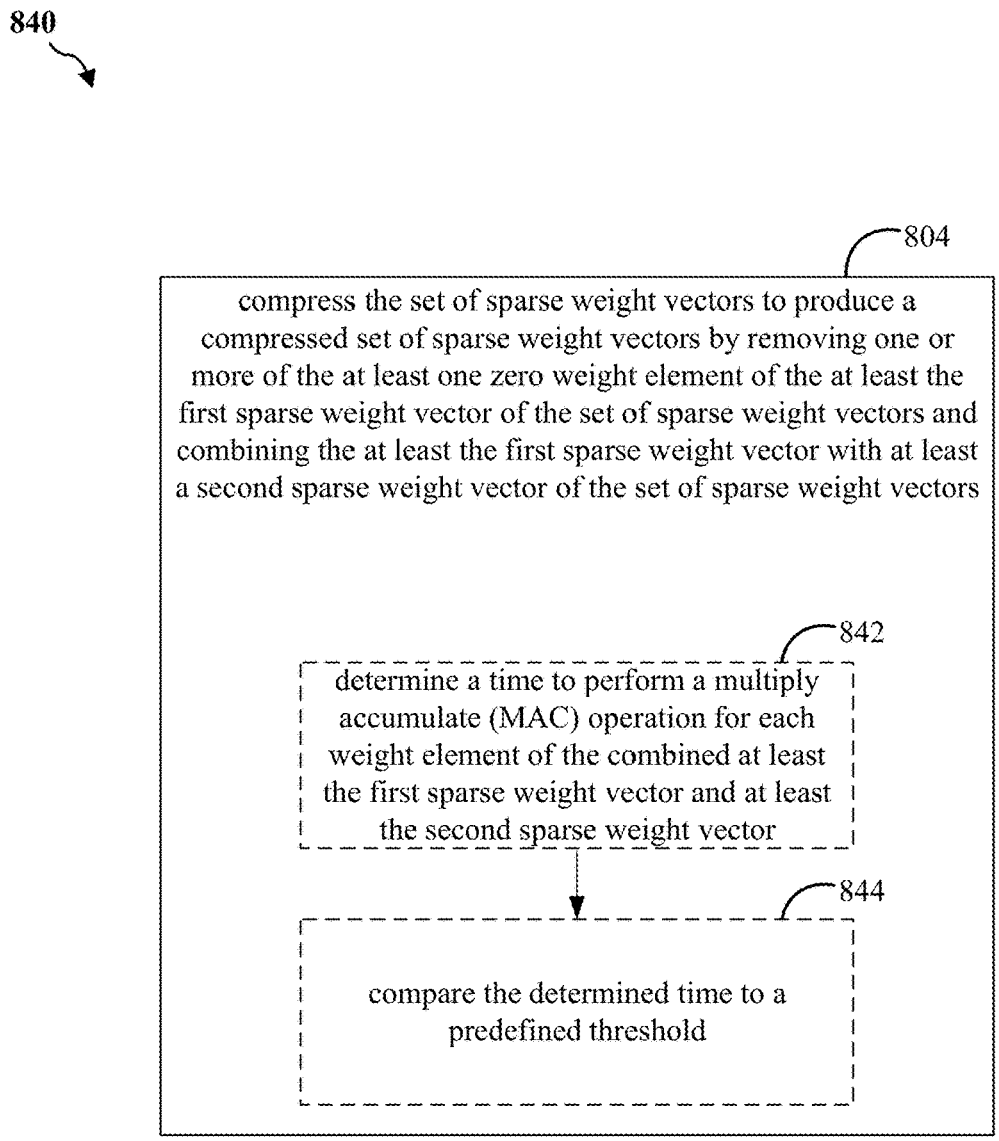

At operation 804, the set of sparse weight vectors may be compressed to produce a compressed set of sparse weight vectors. In one aspect, the set of sparse weight vectors may be compressed to produce the compressed set of sparse weight vectors by removing one or more of the at least one zero weight element of at least the first sparse weight vector of the set of sparse weight vectors and, additionally, combining at least the first sparse weight vector with at least a second weight vector of the set of sparse weight vectors. In one aspect, the compression of the set of sparse weight vectors to produce the compressed set of sparse weight vectors may be based at least in part on a first number of the at least one non-zero weight element of at least the first sparse weight vector and a second number of the at least one non-zero weight element of at least the second sparse weight vector. FIG. 8C, infra, may describe an aspect of compressing the set of sparse weight vectors.

In the context of FIGS. 4A-E and 5-7, the controller 720 may compress the set of sparse weight vectors to produce the compressed set of sparse weight vectors by removing one or more of the at least one zero weight element of at least the first sparse weight vector and combining at least the first sparse weight vector with at least a second sparse weight vector of the set of sparse weight vectors. For example, the controller 720 may compress the set of sparse weight vectors 420 to produce a compressed set of sparse weight vectors. In one aspect, the controller 720 may compress the set of sparse weight vectors 420 by removing the zero-weight elements 422a-b. In addition the controller may combine each sparse weight vector with another sparse weight vector. For example, the controller 720 may determine the combinations 424 of sparse weight vectors and/or the controller 720 may split one or more combinations to form additional combinations 444a-h when MAC operations are to be spread across two clock cycles.

In one aspect, the controller 720 may map activations to MAC elements 464a-h. For example, the controller 720 may map activations 406a-h to MAC elements 464a-h, and MAC operations for one or more activations 406a-h and one or more weights of a set of sparse weight vectors 460 may be compressed into another (e.g., prior) clock cycle (e.g., when a MAC element 464 is available for computations). In some aspects, the controller 720 may insert one or more inserted weights 468 in order to add a zero weight to the set of sparse weight vectors 460, e.g., when the local sparsity exceeds a threshold.

In one aspect, the controller 720 may produce a compressed set of sparse weight vectors 480 by combining mappings of MAC elements. For example, the controller 720 may combine mappings to MAC elements 464a-h. Accordingly, each column of the compressed set of sparse weight vectors 480 may occur in a single clock cycle. In some aspects, the controller 720 may insert one or more inserted weights 468 in order to add a zero weight to the set of sparse weight vectors 460, e.g., when the local sparsity exceeds a threshold. The compressed set of sparse weight vectors 480 may be stored in memory, such as memory 500. For example, the compressed set of sparse weight vectors 480 may be linearly mapped in memory 500.

At operation 806, a neural network may be operated based on the compressed set of sparse weight vectors. For example, weights of a sparse weight vector of the compressed set of sparse weight vectors may be aligned with corresponding activations, and one or more nodes of the neural network (e.g., at a current layer) may be evaluated based on the weights aligned with the corresponding activations. FIG. 8D, infra, may describe an aspect of operating the neural network based on the compressed set of sparse weight vectors.

In the context of FIGS. 4A-E and 5-7, the controller 720 may obtain an input for a neural network. The input may be processed through the neural network such that the controller 720 provides an input vector to the inputs 702a-b. At least one activation of an input vector of the set of the input vectors may be selected based on the activation selection value 714, and the selected activation may be aligned with corresponding weights of the compressed set of sparse weight vectors 716. A set of partial sums may be accumulated based on the selected activation aligned with the corresponding weights of the compressed set of sparse weight vectors 716. The set of partial sums may be provided to the PSH 740, which may calculate activations for one or more nodes the neural network (e.g., nodes of a current layer of the neural network) and provide those activations for one or more other nodes of the neural network (e.g., nodes of a next layer of the neural network). The neural network may provide an output (e.g., at an output layer of the neural network), which may be based on the partial sums.

FIG. 8B is a method 820 illustrating an aspect of operation 802. For example, in receiving a set of sparse weight vectors, operation 822 and operation 824 may be performed. At operation 822, a set of non-sparse weight vectors may be received. The set of non-sparse weight vectors may include a greater amount of non-zero weight elements than zero-weight elements and, in some aspects, the set of non-sparse weight vectors may include no zero-weight elements. In the context of FIGS. 4-AE and 5-7, the controller 720 may receive a set of non-sparse weight vectors. For example, the controller 720 may receive the set of weight vectors 400.

At operation 824, a set of sparse weight vectors may be generated. For example, a function may be applied to the set of non-sparse weight vectors in order to adjust at least one non-zero weight element of at least one non-sparse weight vector of the set of non-sparse weight vectors to zero. According to various aspects, the function may include at least one of one a pruning function, a fine-tuning function, a retraining function, and/or another function that is configured to identify one or more weights that may be eliminated without unsatisfactorily degrading accuracy of a layer of the neural network (e.g., an output layer). In other words, a function may be applied to identify one or more weights of the set of non-sparse weight vectors, and the identified one or more weights may be adjusted from a non-zero weight element to a zero weight element.

In the context of FIGS. 4A-E and 5-7, the controller 720 may apply a function to identify one or more weights of one or more non-sparse weight vectors of a set of non-sparse weight vectors and, by application of the function, the controller 720 may cause the identified one or more weights to be adjusted from a non-zero weight element to a zero weight element. For example, the controller 720 may apply a function to the set of weight vectors 400 in order to adjust one or more weights of the set of weight vectors 400 to zero-weight elements 422a-b, which may produce the set of sparse weight vectors 420.

FIG. 8C is a method 840 illustrating an aspect of operation 804. For example, in compressing a set of sparse weight vectors to produce a compressed set of sparse weight vectors, operation 842 and operation 844 may be performed. At operation 842, a time may be determined for performance of a MAC operation for each weight element of the combined at least the first sparse weight vector and at least the second sparse weight vector. The determined time may correspond to a number of clock cycles.

In the context of FIGS. 4A-E and 5-7, the controller 720 may determine a time for performance of a MAC operation for each weight element of the combined at least the first sparse weight vector and at least the second sparse weight vector. In one aspect, the controller 720 may combine weight vectors of the set of sparse weight vectors 420 to form combinations 424. For example, the controller 720 may combine the first sparse weight vector 426*a* and the third sparse weight vector 426*c*, including five weights and six weights, respectively, for a total of eleven clock cycles when mapped to MAC elements with activations. The controller 720 may compare each of the combinations to a first threshold (e.g., eleven clock cycles), which may be a theoretical minimum number of clock cycles in which MAC operations for each of the activations 406*a-h* may be performed.

At operation 844, the determined time may be compared to a predefined threshold. For example, a determined time for MAC operations for a first combination of at least the first sparse weight vector and at least the second sparse weight vector may be compared to a threshold. If the determined time satisfies the threshold (e.g., the determined time is less than the predefined threshold, etc.), then the combinations may be sufficient, and the compressed set of sparse weight vectors maybe used to operate the neural network. However, if the determined time does not satisfy the threshold (e.g., the determined time equals the threshold, the determined time exceeds the predefined threshold, etc.), then the MAC operations for one or more combinations of sparse weight vectors may be split over two clock cycles for an activation. Therefore, MAC operations for one activation may occur over two clock cycles.

In the context of FIGS. 4A-E and 5-7, controller 720 may compare a determined time to a predefined threshold. For example, the controller 720 may compare the combination 424 of the first sparse weight vector 426*a* and the third sparse weight vector 426*c* to a predefined threshold that is the theoretical minimum of eleven clock cycles. This combination 424 of the first sparse weight vector 426*a* and the third sparse weight vector 426*c* may not satisfy the predefined threshold (e.g., may not be less than eleven clock cycles). Therefore, the controller 720 may split MAC operations for the combination 424 of the first sparse weight vector 426*a* and the third sparse weight vector 426*c* so that MAC operations for one or more activations 406*a-b*, 406*d*, 406*f-h* corresponding to weights of the first sparse weight vector 426*a* and the third sparse weight vector 426*c* occur over two clock cycles, e.g., when compressed into the compressed set of sparse weight vectors 480.

FIG. 8D is a method 860 illustrating an aspect of operation 806. For example, in operating the neural network based on the compressed set of sparse weight vectors, operation 862, operation 864, operation 866, and operation 848 may be performed. At operation 862, a set of input vectors may be received. The set of input vectors may include a set of activations. In the context of FIGS. 4A-E and 5-7, the controller 720 may receive a set of input vectors. An input vector may include a set of activations, such as the activations 406*a-h*, which may correspond to channels. The controller 720 may store the activations in memory (e.g., memory 118 of FIG. 1).

At operation 864, a first input vector of the set of received input vectors may be selectively applied to at least one sparse weight vector of the compressed set of sparse weight vectors. In so doing, a respective partial sum may be computed that corresponds to at least one sparse weight vector of the compressed set of sparse weight vectors. For example, two activations of the first input vector may be selected between based on an activation selection value (e.g., an activation value of another node, such as a node of a prior layer of the neural network). The selected activation may be aligned with the corresponding weights of the compressed set of sparse weight vectors. Further, zero-weight elements corresponding to the selected activation may be ignored, e.g., in order to perform sparse computation. By selectively applying an activation of the first input vector to at least one sparse weight vector, the compressed set of sparse weight vectors may be used without first decompressing the compressed set of sparse weight vectors.

In the context of FIGS. 4A-E and 5-7, the controller 720 may selectively apply a first input (e.g., an activation selected from one of inputs 702*a-b*) to at least one sparse weight vector of the compressed set of sparse weight vectors 716. For example, the controller 720 may select a first activation received at the first input 702*a* instead of a second activation received at the second input 702*b* based on the activation selection value 714. The controller 720 may align the selected first activation with corresponding weights of the compressed set of sparse weight vectors 716, which may be received from memory 500. In addition, the controller 720 may refrain from computing partial sums for zero-weight elements corresponding to an activation for sparse computation. The controller 720 may cause a MAC element to compute a respective partial sum by providing a selected activation aligned with corresponding weights of the compressed set of sparse weight vectors 716 to the multiplier 706. The multiplier 706 may provide a product to the adder 708, which may add the product to a local sum from other activations with corresponding weights.

As shown in FIG. 6, each of the MAC elements 610*a-h* may include at least two banks 612*a-b*, each having a unique weight mapped thereto. The controller 720 may control the activations 602*a-c* that are provided to each of the MAC elements 610*a-h*. In a first clock cycle, the MAC elements 610*a-h* may compute a first sample of the output 604*a*, which may be provided to the PSH 740. In a second clock cycle, the MAC elements 610*a-h* may compute a second sample of the output 604*a*, which may also be provided to the PSH 740. The controller 720 may subsequently provide the next activations 602*b-c* for computation of additional partial sums to be provided to the PSH 740.

At operation 866, the respective partial sums for each sparse weight vector of the compressed set of sparse weight vectors. For example, a first partial sum for a sparse weight vector of the compressed set of sparse weight vectors may be accumulated with a second partial sum of a second sparse weight vector of the compressed set of sparse weight vectors, and the result may be stored in memory (e.g., in a bank or buffer). In the context of FIGS. 4A-E and 5-7, the controller 720 may accumulate respective partial sums for each sparse weight vector of the compressed set of sparse weight vectors 716 in one of the buffers 710*a-b*. In FIG. 6, the MAC elements 610*a-h* may accumulate partial sums for the activations 602*a-c* in respective banks 612*a-b*.

At operation 868, the neural network may be operated based at least in part on the accumulated partial sums. For example, the partial sums may be provided to a PSH, and partial sums may be propagated to other nodes (e.g., a next layer) of the neural network. In propagating the partial sums through layers of the neural network, the neural network may perform a task for which the neural network is configured, such as pattern recognition or classification of an image. In the context of FIGS. 4A-E and 5-7, the controller 720 may cause the PSH 740 to propagate partial sums through the neural network in order for the neural network to perform a task.

Figure 8E:

FIG. 8E is a method 880 illustrating an aspect of operation 806. For example, in operating the neural network based on the compressed set of sparse weight vectors, operation 882 may be performed. At operation 882, the sparse weight vectors of the compressed set of sparse weight vectors may remain compressed, and the neural network may be operated based on the compressed set of sparse weight vectors. For example, weights of the compressed set of weight vectors may be reordered to match the order of activations from a previous layer. The weights of the compressed set of weight vectors may be reordered a priori. In the context of FIGS. 4A-E and 5-7, the controller 720 may refrain from uncompressing cause the neural network to be operating without uncompressing the compressed set of sparse weight vectors 716. For example, the neural network may be operated based on the compressed set of sparse weight vectors 480 without uncompressing the compressed set of sparse weight vectors 480.

Figure 9A:
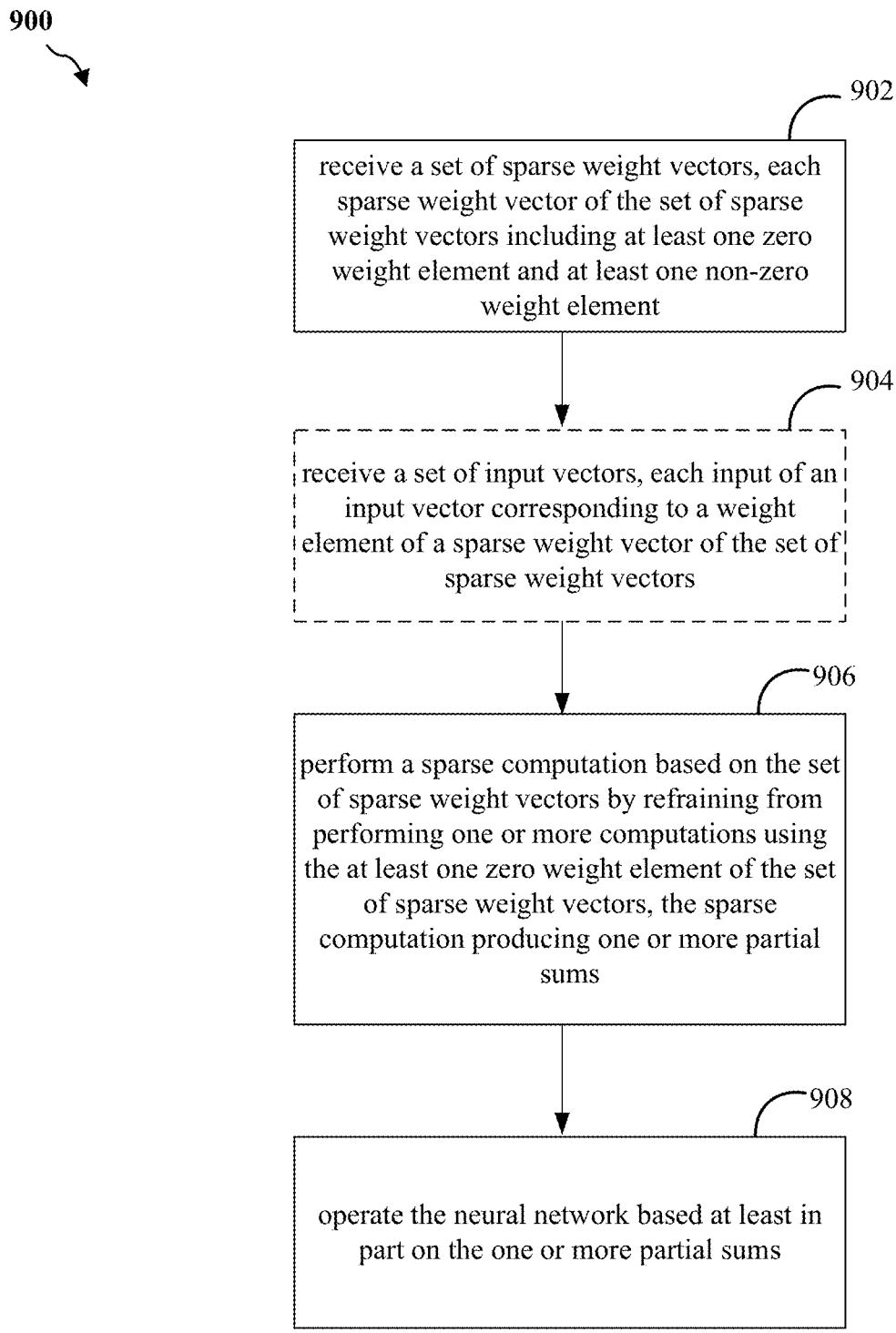

FIG. 9AB illustrate methods 900, 920 for operating a neural network based on a compressed set of sparse weight vectors, in accordance with various aspects of the present disclosure. The methods 900, 920 may be practiced in various components of the present disclosure, including the SOC 100 of FIG. 1, the MAC elements 610a-h of FIG. 6, and/or the architecture 700 of FIG. 7. In various aspects, one or more of the operations may be omitted, transposed, and/or contemporaneously performed. Some potential optional operations may be illustrated with dashed lines.

First with respect to FIG. 9A, at operation 902, a set of sparse weight vectors may be received. The set of sparse weight vectors may include at least one zero-weight element and at least one non-zero weight element. For example, a set of sparse weight vectors may be identified in memory, and the identified set of sparse weight vectors may be accessed from memory. In one aspect, the set of sparse weight vectors may be compressed.

In the context of FIGS. 4A-E and 5-7, the controller 720 may receive a set of sparse weight vectors. For example, the controller 720 may receive the set of sparse weight vectors 420, and the set of sparse weight vectors may include weights that are not zero and may also include one or more zero-weight elements 422a-b. In one aspect, the set of sparse weight vectors 420 may be based on a set of non-sparse weight vectors, such as the set of weight vectors 400. In one aspect, the set of sparse weight vectors 420 may be compressed, e.g., so that the compressed set of sparse weight vectors 480 is used.

At operation 904, a set of input vectors may be received. Each input of an input vector may correspond to at least one weight of a sparse weight vector of a set of sparse weight vectors. The set of input vectors may include a set of activations. In the context of FIGS. 4A-E and 5-7, the controller 720 may receive a set of input vectors. The set of input vectors may include a set of activations, such as the activations 406a-h (e.g., channels). Each of the weights of the set of sparse weight vectors 420 may correspond to a different one of the activations 406a-h. The controller 720 may store the set of input vectors in memory (e.g., memory 118 of FIG. 1).

At operation 906, sparse computation may be performed based on the set of sparse weight vectors. In aspects, sparse computation may be performed by refraining from one or more computations using the at least one zero weight element of the set of sparse weight vectors. Further, sparse computation may produce one or more partial sums. For example, for non-zero weights, an activation may be selected an multiplied with a weight, the product may be added with a local sum from previous iterations, and the local sum may be accumulated in a bank or buffer. FIG. 9B, infra, may describe an aspect of performance of sparse computation based on the set of sparse weight vectors.

In the context of FIGS. 4A-E and 5-7, the controller 720 may select an activation from inputs 702a-b. The multiplier 706 may perform a multiplication operation on the selected activation and a weight of the sparse weight vector that corresponds with the selected activation. The product may be provided to the adder 708, which may add the product to a previous output to produce a partial sum. However, the controller 720 may control the inputs to the multiplier 706 so that the multiplier 706 does not perform computations on zero-weight elements and corresponding activations.

At operation 908, the neural network may be operated based at least in part on the one or more partial sums. For example, the partial sums produced by sparse computation may be provided to a PSH, and the PSH may propagate the partial sums to other nodes of the neural network (e.g., the next layer of the neural network). In so doing, the neural network may perform a task, such as pattern recognition or classification of an image. In various aspects, the set of sparse weight vectors may be compressed, and the compressed set of sparse weight vectors may remain compressed when operating the neural network. In the context of FIGS. 4A-E and 5-7, the controller 720 may cause the PSH 740 to propagate partial sums through the neural network in order for the neural network to perform a task.

FIG. 9B is a method 920 illustrating an aspect of operation 906. For example, in performing sparse computation based on the set of sparse weight vectors, operation 922 and operation 924 may be performed. At operation 922, the selection of inputs of the first input vector may be controlled to select inputs that correspond to the at least one non-zero weight element of the sparse weight vector. For example, inputs corresponding to non-zero weight elements may be fetched from memory. In the context of FIGS. 4A-E and 5-7, the controller 720 may control the inputs 702a-b so that inputs are selected for which the weight of the compressed set of weight vectors 716 is non-zero.

At operation 924, inputs of the first input vector that correspond to the at least one zero-weight element of the sparse weight vector are unselected. For example, inputs corresponding to zero weight elements may not be fetched from memory. Accordingly, unnecessary memory access (e.g., reads) and/or computations (e.g., MAC operations) may be avoided, thus decreasing resource consumption and overhead. In the context of FIGS. 4A-E and 5-7, the controller 720 may refrain from selecting inputs 702a-b that correspond to zero-weight elements of a sparse weight vector. For example, the controller 720 may refrain from selecting one or more activations 406a-h for MAC operations when the one or more activations 406a-h correspond to zero-weight elements 422a-b of the set of sparse weight vectors 420.

In one configuration, an apparatus may be configured for operating a neural network based on a compressed set of weight vectors. The apparatus may be configured to receive a set of sparse weight vectors, wherein at least a first sparse weight vector of the set of sparse weight vectors includes at least one zero weight element and at least one non-zero weight element. The apparatus may be configured to compress the set of sparse weight vectors to produce a compressed set of sparse weight vectors by removing one or more of the at least one zero weight element of at least the first sparse weight vector of the set of sparse weight vectors and combining at least the first sparse weight vector with at least a second sparse weight vector of the set of sparse weight vectors. The apparatus may be configured to operate the neural network based on the compressed set of sparse weight vectors.

In furtherance thereto, the apparatus may include means for receiving a set of sparse weight vectors, and at least a first sparse weight vector of the set of sparse weight vectors includes at least one zero weight element and at least one non-zero weight element. The means for receiving a set of sparse weight vectors may be the general-purpose processor 102, program memory associated with the general-purpose processor 102, memory block 118, local processing units 202, and/or the routing connection processing units 216 configured to perform the functions recited. In another configuration, the aforementioned means may include any of at least one component or apparatus configured to perform the functions recited by the aforementioned means, such as the MAC elements 610*a-h*, the controller 720, or another component. In another configuration, an algorithm to be performed by the aforementioned means may be described with respect to the methods 800 and/or 820.

The apparatus may include means for compressing the set of sparse weight vectors to produce a compressed set of sparse weight vectors. The means for compressing the set of sparse weight vectors to produce the compressed set of sparse weight vectors may be configured to remove one or more of the at least one zero weight element of at least the first sparse weight vector of the set of sparse weight vectors and configured to combine at least the first sparse weight vector with at least a second sparse weight vector of the set of sparse weight vectors. The means for compressing the set of sparse weight vectors to produce a compressed set of sparse weight vectors may be the general-purpose processor 102, program memory associated with the general-purpose processor 102, memory block 118, local processing units 202, and/or the routing connection processing units 216 configured to perform the functions recited. In another configuration, the aforementioned means may include any of at least one component or apparatus configured to perform the functions recited by the aforementioned means, such as the controller 720 or another component. In another configuration, an algorithm to be performed by the aforementioned means may be described with respect to the methods 800, 840.

The apparatus may include means for operating the neural network based on the compressed set of sparse weight vectors. The means for operating the neural network may be the general-purpose processor 102, program memory associated with the general-purpose processor 102, memory block 118, local processing units 202, and/or the routing connection processing units 216 configured to perform the functions recited. In another configuration, the aforementioned means may include any of at least one component or apparatus configured to perform the functions recited by the aforementioned means, such as the memory 500, the MAC elements 610*a-h*, the multiplier 706, the adder 708, the buffers 710*a-b*, the controller 720, the PSH 740, or another component. In another configuration, an algorithm to be performed by the aforementioned means may be described with respect to the methods 800, 860, 880.

In one configuration, an apparatus may be configured for operating a neural network based on one or more partial sums. The apparatus may be configured to receive a set of sparse weight vectors, and each sparse weight vector may include at least one zero weight element and at least one non-zero weight element. The apparatus may be configured to perform a sparse computation based on the set of sparse weight vectors by refraining from performing one or more computations using the at least one zero weight element of the each sparse weight vector of the set of sparse weight vectors, and the performance of the sparse computation produces one or more partial sums. The apparatus may be configured to operate the neural network based at least in part on the one or more partial sums.

In furtherance thereto, the apparatus may include means for receiving a set of sparse weight vectors, and each sparse weight vector comprising at least one zero weight element and at least one non-zero weight element. The means for receiving a set of sparse weight vectors may be the general-purpose processor 102, program memory associated with the general-purpose processor 102, memory block 118, local processing units 202, and/or the routing connection processing units 216 configured to perform the functions recited. In another configuration, the aforementioned means may include any of at least one component or apparatus configured to perform the functions recited by the aforementioned means, such as the MAC elements 610*a-h*, the controller 720, or another component. In another configuration, an algorithm to be performed by the aforementioned means may be described with respect to the method 900.

The apparatus may include means for receiving a set of input vectors, and each input of a first input vector of the set of input vectors may correspond to a weight element of a sparse weight vector of the set of sparse weight vectors. The means for receiving a set of input vectors may be the general-purpose processor 102, program memory associated with the general-purpose processor 102, memory block 118, local processing units 202, and/or the routing connection processing units 216 configured to perform the functions recited. In another configuration, the aforementioned means may include any of at least one component or apparatus configured to perform the functions recited by the aforementioned means, such as the MAC elements 610*a-h*, inputs 702*a-b*, the multiplier 706, the adder 708, the controller 720, or another component. In another configuration, an algorithm to be performed by the aforementioned means may be described with respect to the method 900.

The apparatus may include means for performing a sparse computation based on the set of sparse weight vectors. The means for performing the sparse computation based on the set of sparse weight vectors may be configured to refrain from performing one or more computations using the at least one zero weight element of the each sparse weight vector of the set of sparse weight vectors. The means for performing the sparse computation based on the set of sparse weight vectors may be configured to produce one or more partial sums. The means for performing the sparse computation based on the set of sparse weight vectors may be the general-purpose processor 102, program memory associated with the general-purpose processor 102, memory block 118, local processing units 202, and/or the routing connection processing units 216 configured to perform the functions recited. In another configuration, the aforementioned means may include any of at least one component or apparatus configured to perform the functions recited by the aforementioned means, such as the MAC elements 610*a-h*, the multiplier 706, the adder 708, the buffers 710*a-b*, the controller 720, or another component. In another configuration, an algorithm to be performed by the aforementioned means may be described with respect to the methods 900, 920.

The apparatus may include means for operating the neural network based at least in part on the one or more partial sums. The means for operating the neural network may be the general-purpose processor 102, program memory associated with the general-purpose processor 102, memory block 118, local processing units 202, and/or the routing connection processing units 216 configured to perform the functions recited. In another configuration, the aforementioned means may include any of at least one component or apparatus configured to perform the functions recited by the aforementioned means, such as the MAC elements 610*a-h*, the controller 720, the PSH 740, or another component. In another configuration, an algorithm to be performed by the aforementioned means may be described with respect to the method 900.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

In some aspects, methods 800, 820, 840, 860, 800 and/or methods 900, 920 may be performed by the SOC 100 (FIG. 1) or the system 200 (FIG. 2). That is, each of the elements of methods 800, 820, 840, 860, 800 and/or methods 900, 920 may, for example, but without limitation, be performed by the SOC 100 or the system 200 or one or more processors (e.g., CPU 102 and local processing unit 202) and/or other components included therein.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, the term "receiving" may include receiving (e.g., receiving information), obtaining (e.g., obtaining data in a memory), and the like. For example, "receiving" may be performed within one system.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may include a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may include a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may include packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may include one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may include a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may include non-transitory computer-readable media (e.g., tangible media). In addition, for other aspects computer-readable media may include transitory computer-readable media (e.g., a signal). Combinations of the above should also be included within the scope of computer-readable media.

Thus, certain aspects may include a computer program product for performing the operations presented herein. For example, such a computer program product may include a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of operating a neural network, comprising:
 receiving a set of sparse weight vectors, wherein a first sparse weight vector of the set of sparse weight vectors includes at least one zero weight element and at least one non-zero weight element;
 compressing the set of sparse weight vectors to produce a compressed set of sparse weight vectors, the compressing including:
  removing the at least one zero weight element from the first sparse weight vector of the set of sparse weight vectors,
  inserting at least one added zero weight element in the first sparse weight vector, the inserting being in response to a number of removed at least one zero weight elements exceeding a threshold, and pairing each sparse weight vector including the first sparse weight vector with one other sparse weight vector including a second sparse weight vector of the set of sparse weight vectors, the pairing being based on respective numbers of non-zero weight elements in the sparse weight vectors to be paired, the pairing of the first sparse weight vector with the second sparse weight vector occurring after the removing and before the inserting, wherein the pairing based on the respective numbers of the non-zero weight elements in the sparse weight vectors includes:
identifying the first sparse weight vector as being associated with a highest number of multiply accumulate (MAC) operations to be performed among the set of sparse weight vectors,
identifying the second sparse weight vector as being associated with a lowest number of MAC operations to be performed among the set of sparse weight vectors,
determining a combined time to perform the highest number of MAC operations and the lowest number of MAC operations, the highest number of MAC operations corresponding to a first number of the non-zero weight elements for the first sparse weight vector and the lowest number of MAC operations corresponding to a second number of the non-zero weight elements for the second sparse weight vector, and
combining the first sparse weight vector and the second sparse weight vector in response to determining the combined time satisfies a threshold number of clock cycles; and
operating the neural network based on the compressed set of sparse weight vectors, wherein each pair of a respective sparse weight vector with a respective one other sparse weight vector including a pair of the first sparse weight vector and the second sparse weight vector is mapped to a respective MAC element of a plurality of MAC elements, wherein the operating the neural network based on the compressed set of sparse weight vectors includes:
performing a first sparse computation based on a first one or more weights of the compressed set of sparse weight vectors in a first layer of the neural network to produce one or more activations,
reordering a second one or more weights of the compressed set of sparse weight vectors to match an order of the one or more activations from the first layer of the neural network,
performing a second sparse computation based on the reordered second one or more weights in a second layer of the neural network following the first layer, and
refraining from uncompressing the compressed set of sparse weight vectors during the first sparse computation and the second sparse computation.

2. The method of claim 1, further comprising:
receiving a set of input vectors;
selectively applying a first input vector of the set of input vectors to at least one sparse weight vector of the compressed set of sparse weight vectors to compute a respective partial sum corresponding to each sparse weight vector of the compressed set of sparse weight vectors;
accumulating the respective partial sum for each sparse weight vector of the compressed set of sparse weight vectors; and
operating the neural network based at least in part on the accumulated respective partial sums.

3. The method of claim 1, further comprising:
receiving a set of non-sparse weight vectors; and
generating the set of sparse weight vectors by applying a function to adjust at least one non-zero weight element of at least one non-sparse weight vector of the set of non-sparse weight vectors to zero.

4. The method of claim 1, wherein the neural network is a feed-forward neural network.

5. A method of operating a neural network, comprising:
receiving a set of sparse weight vectors, each sparse weight vector comprising at least one zero weight element and at least one non-zero weight element;
performing a sparse computation based on the set of sparse weight vectors by refraining from performing one or more computations using the at least one zero weight element of each sparse weight vector of the set of sparse weight vectors, wherein the performing the sparse computation produces one or more partial sums, wherein each sparse weight vector of the set of sparse weight vectors is mapped to a respective multiply accumulate (MAC) element of a plurality of MAC elements based on each sparse weight vector of the set of sparse weight vectors being paired with a respective other sparse weight vector of the set of sparse weight vectors based on respective numbers of zero weight elements in the sparse weight vectors to be paired, wherein the pairing based on the respective numbers of the zero weight elements in the sparse weight vectors includes determining a combined time to perform a first number of MAC operations and a second number of MAC operations, the first number of MAC operations corresponding to a first number of the zero weight elements for one of the sparse weight vectors and the second number of MAC operations corresponding to a second number of the zero weight elements for another of the sparse weight vectors, and combining the one of the sparse weight vectors and the another of the sparse weight vectors in response to determining the combined time satisfies a threshold number of clock cycles; and
operating the neural network based at least in part on the one or more partial sums, wherein the method further comprises:
compressing the set of sparse weight vectors to produce a compressed set of sparse weight vectors, the compressing including:
removing the at least one zero weight element from a first sparse weight vector of the set of sparse weight vectors,
inserting at least one added zero weight element in the first sparse weight vector in response to a number of removed at least one zero weight elements exceeding a threshold, and
pairing each sparse weight vector including the first sparse weight vector with one other sparse weight vector including a second sparse weight vector of the set of sparse weight vectors, the pairing being based on respective numbers of zero weight elements in the sparse weight vectors to be paired, the pairing of the first sparse weight vector with the second sparse weight vector occurring after the removing and before the inserting;
wherein the pairing based on the respective numbers of the zero weight elements in the sparse weight vectors further includes:

identifying the first sparse weight vector of the set of sparse weight vectors as being associated with a highest number of multiply accumulate (MAC) operations to be performed among the set of sparse weight vectors, the first number of MAC operations being the highest number of MAC operations and the one of the sparse weight vectors being the first sparse weight vector, identifying the second sparse weight vector of the set of sparse weight vectors as being associated with a lowest number of MAC operations to be performed among the set of sparse weight vectors, the second number of MAC operations being the lowest number of MAC operations and the another of the sparse weight vectors being the second sparse weight vector, and wherein the operating the neural network includes:
the sparse computation being performed based on a first one or more weights of the set of sparse weight vectors in a first layer of the neural network to produce one or more activations,
reordering a second one or more weights of the set of sparse weight vectors to match an order of the one or more activations from the first layer of the neural network,
performing a second sparse computation based on the reordered second one or more weights in a second layer of the neural network following the first layer, and
refraining from uncompressing the set of sparse weight vectors during the first sparse computation and the second sparse computation.

6. The method of claim 5, further comprising:
receiving a set of input vectors, each input of a first input vector of the set of input vectors corresponding to a weight element of a sparse weight vector of the set of sparse weight vectors, wherein
the performing the sparse computation based on the set of sparse weight vectors further comprises controlling selection of inputs of the first input vector that correspond to the at least one non-zero weight element of the sparse weight vector.

7. The method of claim 5, wherein the set of sparse weight vectors is compressed, and wherein the compressed set of sparse weight vectors remains compressed when operating the neural network.

8. An apparatus for operating a neural network, comprising:
a memory; and
at least one processor coupled to the memory and configured to:
receive a set of sparse weight vectors, wherein a first sparse weight vector of the set of sparse weight vectors includes at least one zero weight element and at least one non-zero weight element;
compress the set of sparse weight vectors to produce a compressed set of sparse weight vectors, the compression including:
removal of the at least one zero weight element from the first sparse weight vector of the set of sparse weight vectors,
insertion of at least one added zero weight element in the first sparse weight vector, the insertion being in response to a number of removed at least one zero weight elements exceeding a threshold, and
pairing of each sparse weight vector including the first sparse weight vector with one other sparse weight vector including a second sparse weight vector of the set of sparse weight vectors, the pairing being based on respective numbers of non-zero weight elements in the sparse weight vectors to be paired, the pairing of the first sparse weight vector with the second sparse weight vector occurring after the removal and before the insertion, wherein the pairing based on the respective numbers of the non-zero weight elements in the sparse weight vectors includes:
identification of the first sparse weight vector as being associated with a highest number of multiply accumulate (MAC) operations to be performed among the set of sparse weight vectors,
identification of the second sparse weight vector as being associated with a lowest number of MAC operations to be performed among the set of sparse weight vectors,
determination of a combined time to perform the highest number of MAC operations and the lowest number of MAC operations, the highest number of MAC operations corresponding to a first number of the non-zero weight elements for the first sparse weight vector and the lowest number of MAC operations corresponding to a second number of the non-zero weight elements for the second sparse weight vector, and
combination of the first sparse weight vector and the second sparse weight vector in response to determining the combined time satisfies a threshold number of clock cycles; and
operate the neural network based on the compressed set of sparse weight vectors, wherein each pair of a respective sparse weight vector with a respective one other sparse weight vector including a pair of the first sparse weight vector and the second sparse weight vector is mapped to a respective MAC element of a plurality of MAC elements, wherein the operating the neural network based on the compressed set of sparse weight vectors includes:
performance of a first sparse computation based on a first one or more weights of the compressed set of sparse weight vectors in a first layer of the neural network to produce one or more activations,
reordering of a second one or more weights of the compressed set of sparse weight vectors to match an order of the one or more activations from the first layer of the neural network,
performance of a second sparse computation based on the reordered second one or more weights in a second layer of the neural network following the first layer, and
a refrain from uncompressing the compressed set of sparse weight vectors during the first sparse computation and the second sparse computation.

9. The apparatus of claim 8, wherein the at least one processor is further configured to:
receive a set of input vectors;
selectively apply a first input vector of the set of input vectors to at least one sparse weight vector of the compressed set of sparse weight vectors to compute a respective partial sum corresponding to each sparse weight vector of the compressed set of sparse weight vectors;
accumulate the respective partial sum for each sparse weight vector of the compressed set of sparse weight vectors; and operate the neural network based at least in part on the accumulated respective partial sums.

10. The apparatus of claim 8, wherein the at least one processor is further configured to:
receive a set of non-sparse weight vectors; and
generate the set of sparse weight vectors by application of a function to adjust at least one non-zero weight element of at least one non-sparse weight vector of the set of non-sparse weight vectors to zero.

11. An apparatus for operating a neural network, comprising:
a memory; and
at least one processor coupled to the memory and configured to:
  receive a set of sparse weight vectors, each sparse weight vector comprising at least one zero weight element and at least one non-zero weight element, each of the set of sparse weight vectors being paired with one other sparse weight vector of the set of sparse weight vectors based on respective numbers of zero weight elements in the sparse weight vectors to be paired, wherein the pairing based on the respective numbers of the zero weight elements in the sparse weight vectors includes determination of a combined time to perform a first number of multiply accumulate (MAC) operations and a second number of MAC operations, the first number of MAC operations corresponding to a first number of the zero weight elements for one of the sparse weight vectors and the second number of MAC operations corresponding to a second number of the zero weight elements for another of the sparse weight vectors, and combination of the one of the sparse weight vectors and the another of the sparse weight vectors in response to determining the combined time satisfies a threshold number of clock cycles;
  perform a sparse computation based on the set of sparse weight vectors by refraining from performance of one or more computations using the at least one zero weight element of each sparse weight vector of the set of sparse weight vectors, wherein the performance of the sparse computation produces one or more partial sums; and
  operate the neural network based at least in part on the one or more partial sums, wherein each pair of a respective sparse weight vector with a respective one other sparse weight vector is mapped to a respective MAC element of a plurality of MAC elements, wherein the at least one processor is further configured to:
compress the set of sparse weight vectors to produce a compressed set of sparse weight vectors, the compression including:
  removal of the at least one zero weight element from a first sparse weight vector of the set of sparse weight vectors,
  insertion of at least one added zero weight element in the first sparse weight vector in response to a number of removed at least one zero weight elements exceeding a threshold, and
  pairing of each sparse weight vector including the first sparse weight vector with one other sparse weight vector including a second sparse weight vector of the set of sparse weight vectors, the pairing being based on respective numbers of zero weight elements in the sparse weight vectors to be paired, the pairing of the first sparse weight vector with the second sparse weight vector occurring after the removing and before the inserting;
wherein the pairing based on the respective numbers of the zero weight elements in the sparse weight vectors further includes:
  identification of the first sparse weight vector of the set of sparse weight vectors as being associated with a highest number of multiply accumulate (MAC) operations to be performed among the set of sparse weight vectors, the first number of MAC operations being the highest number of MAC operations and the one of the sparse weight vectors being the first sparse weight vector,
  identification of the second sparse weight vector of the set of sparse weight vectors as being associated with a lowest number of MAC operations to be performed among the set of sparse weight vectors, the second number of MAC operations being the lowest number of MAC operations and the another of the sparse weight vectors being the second sparse weight vector, and
wherein the operation of the neural network includes:
  the sparse computation being performed based on a first one or more weights of the set of sparse weight vectors in a first layer of the neural network to produce one or more activations,
  reordering of a second one or more weights of the set of sparse weight vectors to match an order of the one or more activations from the first layer of the neural network,
  performance of a second sparse computation based on the reordered second one or more weights in a second layer of the neural network following the first layer, and
  a refrain from uncompressing the set of sparse weight vectors during the first sparse computation and the second sparse computation.

12. The apparatus of claim 11, wherein the at least one processor is further configured to:
receive a set of input vectors, each input of a first input vector of the set of input vectors corresponding to a weight element of a sparse weight vector of the set of sparse weight vectors,
wherein to perform the sparse computation based on the set of sparse weight vectors further, the at least one processor is configured to control selection of inputs of the first input vector that correspond to the at least one non-zero weight element of the sparse weight vector.

13. The apparatus of claim 11, wherein the set of sparse weight vectors is compressed, and wherein the compressed set of sparse weight vectors remains compressed when operating the neural network.

* * * * *